(12) United States Patent
Tanaka

(10) Patent No.: US 6,890,097 B2
(45) Date of Patent: May 10, 2005

(54) TEMPERATURE MEASURING SENSOR INCORPORATED IN SEMICONDUCTOR SUBSTRATE, AND SEMICONDUCTOR DEVICE CONTAINING SUCH TEMPERATURE MEASURING SENSOR

(75) Inventor: Nobue Tanaka, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/654,126

(22) Filed: Sep. 4, 2003

(65) Prior Publication Data

US 2004/0071189 A1 Apr. 15, 2004

(30) Foreign Application Priority Data

Oct. 9, 2002 (JP) ........................................ 2002-295507

(51) Int. Cl.[7] ................................................. G01K 7/01
(52) U.S. Cl. ........................ 374/185; 374/178; 374/163; 702/133
(58) Field of Search ................................. 374/185, 170, 374/183, 178, 163; 327/512, 513; 702/130, 133; 716/4

(56) References Cited

U.S. PATENT DOCUMENTS 3,812,717 A      5/1974   Miller et al.
5,982,221 A  *  11/1999   Tuthill ......................... 327/512
6,149,299 A  *  11/2000   Aslan et al. ................. 374/178
6,345,238 B1 *   2/2002   Goodwin ..................... 702/130
6,674,185 B2 *   1/2004   Mizuta ........................ 307/651
6,679,628 B2 *   1/2004   Breinlinger ................. 374/178
6,736,540 B1 *   5/2004   Sheehan et al. ............ 374/183

FOREIGN PATENT DOCUMENTS

JP           3-154833        7/1991

* cited by examiner

Primary Examiner—Gail Verbitsky
(74) Attorney, Agent, or Firm—Young & Thompson

(57) ABSTRACT

A temperature measuring sensor is incorporated in a substrate of a semiconductor device and has a diode, and resistor formed in the substrate and connected in series. When a first forward constant current is supplied to the diode through the resistor, a potential difference $V_{A1}$ is produced between terminal ends of both the diode and the resistor, and a potential difference $V_{F1}$ is produced between terminal ends of the diode. When a second forward constant current is supplied to the diode through the resistor, a potential difference $V_{A2}$ is produced between the terminal ends of both the diode and the resistor, and a potential difference $V_{F2}$ is produced between the terminal ends of the diode. A real temperature T of the substrate is calculated by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

9 Claims, 13 Drawing Sheets

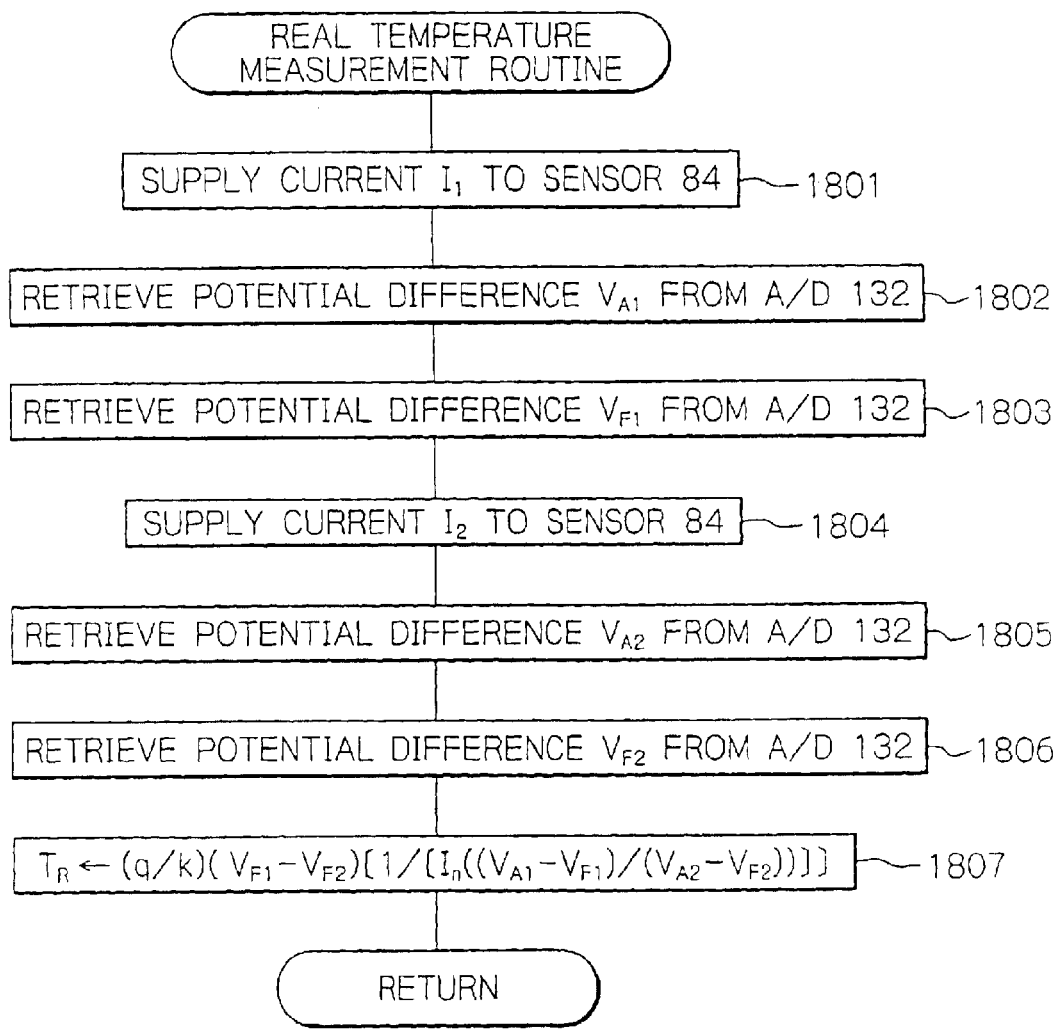

TEMPERATURE MEASURING SENSOR INCORPORATED IN SEMICONDUCTOR SUBSTRATE, AND SEMICONDUCTOR DEVICE CONTAINING SUCH TEMPERATURE MEASURING SENSOR

BACKGROUND OF THE INVENTION

1. Field of the Invention

The present invention relates to a temperature measuring sensor incorporated in a semiconductor substrate to measure a temperature of the semiconductor substrate. Also, the present invention relates to a semiconductor device containing a temperature measuring sensor which is incorporated in a substrate of the semiconductor device to thereby measure a temperature of the semiconductor device. Further, the present invention is relates to a temperature measurement method using the temperature measuring sensor, and various systems using the temperature measuring sensor.

2. Description of the Related Art

In general, a semiconductor device, such as a central processing unit, a microprocessing unit, a digital signal processor or the like, has a large consumption of current, and thereby generates a large amount of heat in operation. Thus, when the semiconductor device is operated in a high temperature environment, it has a tendency to increase in temperature, and a large rise in the temperature can cause a thermal runaway in the semiconductor device, resulting in a malfunction of the semiconductor device.

Accordingly, it is necessary to recognize whether or not the semiconductor device is operated in a given proper range of temperature. Also, it is necessary to control the operational temperature of the semiconductor device before a proper operation of the semiconductor device can be ensured. At any rate, to these ends, the operational temperature of the semiconductor device must be precisely measured during the operation of the semiconductor device.

Conventionally, for example, as disclosed in, for example, Japanese Laid-Open Patent Publication (KOKAI) No. HEI-03-154833 and U.S. Pat. No. 3,812,717, in order to measure the operational temperature of the semiconductor device, it is proposed to incorporate a temperature measuring sensor into a substrate of the semiconductor device, and the temperature measuring sensor comprises a semiconductor diode formed in the substrate, to thereby detect the operational temperature of the semiconductor device. Nevertheless, the conventional temperature measuring sensor fails to precisely measure the operational temperature of the semiconductor device, as discussed in detail hereinafter.

SUMMARY OF THE INVENTION

Therefore, a main object of the present invention is to provide a temperature measuring sensor, incorporated in a substrate of a semiconductor device, which is constituted such that an operational temperature of the semiconductor device can be more precisely measured in comparison with a conventional temperature measuring sensor.

Another object of the present invention is to provide a semiconductor device containing a temperature measuring sensor, incorporated in a substrate of the semiconductor device, which is constituted such that an operational temperature of the semiconductor device can be more precisely measured in comparison with a conventional temperature measuring sensor.

Yet another object of the present invention is to provide a temperature management system for managing a temperature of a semiconductor device, using such a temperature measuring sensor, whereby an operational temperature of the semiconductor device can be more properly managed in comparison with a conventional temperature management system.

In accordance with a first aspect of the present invention, there is provided a temperature measuring sensor that is incorporated in a substrate of a semiconductor device to measure a real temperature of the substrate. The temperature measuring sensor comprises a semiconductor diode formed in the substrate, and a resistor formed in the substrate and connected to the semiconductor diode in series. When a first forward constant current is supplied to the semiconductor diode through the resistor, a potential difference $V_{A1}$ is produced between terminal ends of both the semiconductor diode and the resistor connected in series, and a potential difference $V_{F1}$ is produced between terminal ends of the semiconductor diode. When a second forward constant current is supplied to the semiconductor diode through the resistor, a potential difference $V_{A2}$ is produced between terminal ends of both the semiconductor diode and the resistor connected in series, and a potential difference $V_{F2}$ is produced between terminal ends of the semiconductor diode. The measurement of the real temperature is carried out based on the four potential differences $V_{A1}$, $V_{F1}$, $V_{A2}$ and $V_{F2}$.

The real temperature T of the substrate of the semiconductor device may be calculated by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

The temperature measuring sensor may further comprise three electrode pads formed on the substrate to thereby detect the potential differences ($V_{A1}$ and $V_{F1}$; $V_{A2}$ and $V_{F2}$), the semiconductor diode having a first terminal and a second terminal, the resistor having a first end connected to the first terminal of the semiconductor diode. In this case, one of the three electrode pads is connected to a conductive lead extending from the first terminal of the semiconductor diode at a location in the vicinity of the first terminal of the semiconductor diode, another electrode pad is connected to a conductive lead extending from the second terminal of the semiconductor diode at a location in the vicinity of the second terminal of the semiconductor diode, and the remaining electrode pad is connected to a conductive lead extending from a second end of the resistor, which is remote from the first terminal of the semiconductor diode, at a location in the vicinity of the second end of the resistor.

In accordance with a second aspect of the present invention, there is provided a semiconductor device comprising a semiconductor substrate on which a main circuit section is defined, and a temperature measuring sensor incorporated in the semiconductor substrate so as to measure a real temperature of the semiconductor substrate. The temperature measuring sensor includes a semiconductor diode formed in the semiconductor substrate, and a resistor formed in the semiconductor substrate and connected to the semiconductor diode in series. When a first forward constant current is supplied to the semiconductor diode through the resistor, a potential difference $V_{A1}$ is produced between terminal ends of both the semiconductor diode and the resistor connected in series, and a potential difference $V_{F1}$ is produced between terminal ends of the semiconductor diode. When a second forward constant current is supplied to the semiconductor diode through the resistor, a potential difference $V_{A2}$ is produced between terminal ends of both the semiconductor diode and the resistor connected in series, and a potential difference $V_{F2}$ is produced between terminal ends of the semiconductor diode. The measurement of the real temperature is carried out based on the four potential differences $V_{A1}$, $V_{F1}$, $V_{A2}$ and $V_{F2}$.

In accordance with a third aspect of the present invention, there is provided a temperature management system for managing a temperature of a semiconductor device containing a temperature measuring sensor incorporated in a substrate of the semiconductor device, with the temperature measuring sensor including a semiconductor diode formed in the substrate, and a resistor formed in the substrate and connected to the semiconductor diode in series. The temperature management system comprises an electric constant current source system that selectively supplies a first forward constant current and a second forward constant current to the temperature measuring sensor. When the first forward constant current is supplied to the semiconductor diode through the resistor, a potential difference $V_{A1}$ is produced between terminal ends of both the semiconductor diode and the resistor connected in series, and a potential difference $V_{F1}$ is produced between terminal ends of the semiconductor diode. When the second forward constant current is supplied to the semiconductor diode through the resistor, a potential difference $V_{A2}$ is produced between the terminal ends of both the semiconductor diode and the resistor connected in series, and a potential difference $V_{F2}$ is produced between the terminal ends of the semiconductor diode. The temperature management system further comprises a temperature calculation system that calculates a real temperature T of the substrate of the semiconductor device based on the four potential differences $V_{A1}$, $V_{F1}$, $V_{A2}$, and $V_{F2}$, a cooling system that is associated with the semiconductor device to suppress a rise in the real temperature T of the substrate of the semiconductor device, a monitor system that monitors whether or not the real temperature T of the substrate of the semiconductor device exceeds a predetermined upper temperature limit, and a control system that activates the cooling system to thereby cool the semiconductor device when it is confirmed by the monitor system that the temperature T of the substrate of the semiconductor device exceeds the predetermined upper temperature limit.

In this temperature management system, preferably, the monitor system further monitor whether or not the temperature T of the substrate of the semiconductor device falls below a predetermined low limit temperature after the cooling system is activated by the control system, and the cooling system is deactivated by the control system when it is confirmed by the monitor system that the temperature T of the substrate of the semiconductor device falls below the predetermined lower limit temperature.

In accordance with a fourth aspect of the present invention, there is provided a semiconductor device comprising a semiconductor substrate on which a main circuit section is defined, a first temperature measuring sensor incorporated in the semiconductor substrate so as to measure a real temperature of the semiconductor substrate, a second temperature measuring sensor incorporated in the semiconductor substrate so as to measure a temperature of the semiconductor substrate including an offset amount, and a temperature calibration circuit incorporated in the semiconductor substrate and associated with the second temperature measuring sensor so as to calibrate the temperature of the semiconductor substrate, measured by the second temperature measuring sensor, to eliminate the offset amount therefrom. The temperature calibration circuit includes a memory medium that stores calibration data for the calibration of the temperature of the semiconductor substrate including the offset amount, and the calibration data is prepared based on the real temperature of the semiconductor substrate measured by the first temperature measuring sensor, and is then stored in the memory medium of the temperature calibration circuit.

In the fourth aspect of the present invention, the first temperature measuring sensor may comprise a semiconductor diode formed in the semiconductor substrate, and a resistor formed in the semiconductor substrate and connected to the semiconductor diode in series. When a first forward constant current is supplied to the semiconductor diode through the resistor, a potential difference $V_{A1}$ is produced between terminal ends of both the semiconductor diode and the resistor connected in series, and a potential difference $V_{F1}$ is produced between terminal ends of the semiconductor diode. When a second forward constant current is supplied to the semiconductor diode through the resistor, a potential difference $V_{A2}$ is produced between the terminal ends of both the semiconductor diode and the resistor connected in series, and a potential difference $V_{F2}$ is produced between the terminal ends of the semiconductor diode. A real temperature T of the semiconductor substrate is calculated by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

In accordance with a fifth aspect of the present invention, there is provided a calibration-data preparation/storage system that processes the aforesaid semiconductor device having the first and second measuring sensors, such that the calibration data is prepared and stored in the memory medium. The calibration-data preparation/storage system comprises a first activating system that activates the first temperature measuring sensor to measure the real temperature of the semiconductor substrate, a second activating system that activates the second temperature measuring sensor to measure the temperature of the semiconductor substrate including the offset amount, a calculation system that calculates the offset amount of the temperature of the semiconductor substrate, measured by the second temperature measuring sensor, based on a previously-prepared calibration characteristic of the second temperature measuring sensor, and a writing system that writes the calculated offset amount as the calibration data in the memory medium.

In this calibration-data preparation/storage system, the first temperature measuring sensor may comprise a semiconductor diode formed in the semiconductor substrate, and a resistor formed in the semiconductor substrate and connected to the semiconductor diode in series. When a first forward constant current is supplied to the semiconductor diode through the resistor by the first activating system, a potential difference $V_{A1}$ is produced between terminal ends of both the semiconductor diode and the resistor connected in series, and a potential difference $V_{F1}$ is produced between terminal ends of the semiconductor diode. When a second forward constant current is supplied to the semiconductor diode through the resistor by the first activating system, a potential difference $V_{A2}$ is produced between the terminal ends of both the semiconductor diode and the resistor connected in series, and a potential difference $V_{F2}$ is produced between the terminal ends of the semiconductor diode. The real temperature T of the semiconductor substrate is determined by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

In accordance with a sixth aspect of the present invention, there is provided a temperature measuring method of measuring a temperature of a semiconductor substrate, using a temperature measuring sensor incorporated therein, the temperature measuring sensor having a semiconductor diode formed in the semiconductor substrate, and a resistor formed in the semiconductor substrate and connected to the semiconductor diode in series. The temperature measuring method comprises the steps of supplying a first forward constant current to the semiconductor diode through the resistor such that a potential difference $V_{A1}$ is produced between terminal ends of both the semiconductor diode and the resistor connected in series, and such that a potential difference $V_{F1}$ is produced between terminal ends of the semiconductor diode, supplying a second forward constant current to the semiconductor diode through the resistor such that a potential difference $V_{A2}$ is produced between terminal ends of both the semiconductor diode and the resistor connected in series, and such that a potential difference $V_{F2}$ is produced between terminal ends of the semiconductor diode, and calculating a real temperature T of the semiconductor substrate based on the potential differences $V_{A1}$, $V_{F1}$, $V_{A2}$, and $V_{F2}$.

In the sixth aspect of the present invention, the calculation of the real temperature of the semiconductor substrate may be carried out by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

In accordance with a sixth aspect of the present invention, there is provided a calibration-data preparation/storage method that processes the aforesaid semiconductor device having the first and second measuring sensors, such that the calibration data is prepared and stored in the memory medium. The calibration-data preparation/storage method comprises the steps of activating the first temperature measuring sensor to thereby measure the real temperature of the semiconductor substrate, activating the second temperature measuring sensor to measure the temperature of the semiconductor substrate including the offset amount, calculating the offset amount of the temperature of the semiconductor substrate, measured by the second temperature measuring sensor, based on a previously-prepared calibration characteristic of the second temperature measuring sensor, and writing the calculated offset amount as the calibration data in the memory medium.

BRIEF DESCRIPTION OF THE DRAWINGS

The above objects and other objects will be more clearly understood from the description set forth below, with reference to the accompanying drawings, wherein:

FIG. 18 is a flowchart of the real temperature measurement routine executed at step 1405 of the calibration-data preparation/storage routine shown in FIG. 14, when the test system of FIG. 13 is modified as shown in FIG. 17.

DESCRIPTION OF THE PREFERRED EMBODIMENTS

Before descriptions of embodiments of the present invention, for better understanding of the present invention, a conventional temperature measuring sensor, incorporated in a substrate of a semiconductor device to thereby measure an operational temperature of the semiconductor device, will be explained with reference to FIGS. 1, 2, 3, 4, and 5.

Figure 1:
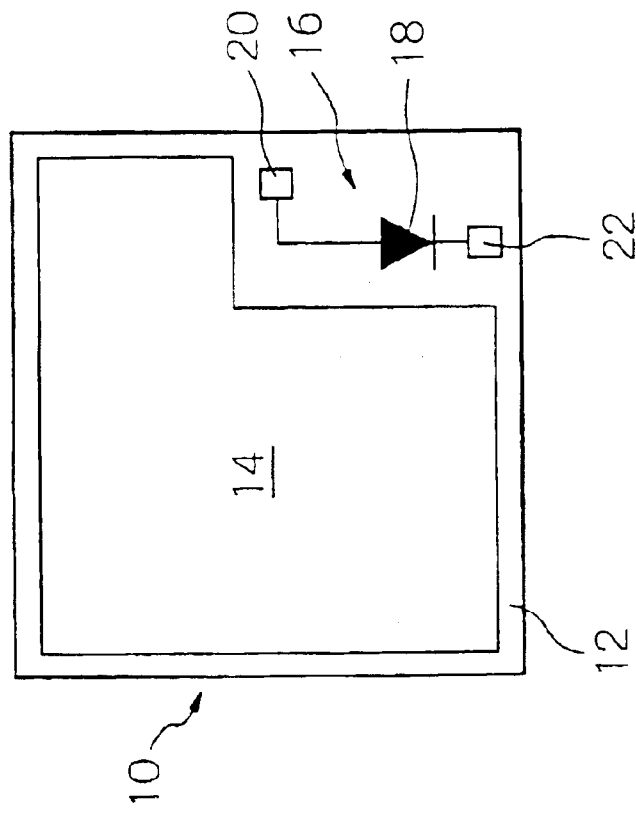
FIG. 1 is a conceptual plan view of a conventional semiconductor device containing a temperature measuring sensor.

First, with reference to FIG. 1, the semiconductor device is generally indicated by reference 10, and comprises a silicon substrate 12, and a main circuit section 14 defined on the silicon substrate 12. The main circuit section 14 includes various circuits which are arranged so that the semiconductor device 10 functions as a central processing unit, a microprocessing unit, a digital signal processor or the like.

As shown in FIG. 1, the semiconductor device 10 contains a temperature measuring sensor 16 incorporated therein. Namely, the temperature measuring sensor 16 comprises a p-n junction diode 18 formed in the silicon substrate 12, and first and second electrode pads 20 and 22 provided on the silicon substrate 12 so as to be associated with the p-n junction diode 18. Namely, the first electrode pad 20 is connected to an anode terminal of the diode 18, and the second electrode pad 22 is connected to a cathode terminal of the diode 18.

Figure 2:
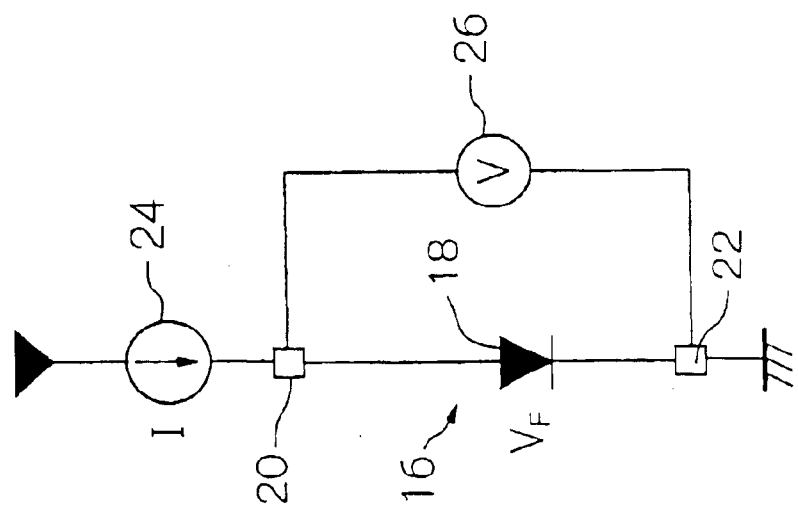
FIG. 2 is a circuit diagram showing a first example of a conventional temperature measuring method using the temperature measuring sensor shown in FIG. 1.

With reference to FIG. 2, a first example of a conventional temperature measuring method using the temperature measuring sensor 16 is conceptually shown, and is representatively disclosed in the above-mentioned Publication No. HEI-03-154833.

When a temperature of the semiconductor device 10, which may be represented by a temperature of the silicon substrate 12, is measured, the first electrode pad 20 is connected to a constant current source 24, and the second electrode pad 22 is grounded. Also, as shown in FIG. 2, a voltage meter 26 is prepared, and is connected to the first and second electrode pads 20 and 22 to detect a voltage produced at the p-n junction diode 18.

As shown in FIG. 2, when the p-n junction diode 18 is supplied with a forward current I from the constant current source 24, a forward voltage $V_F$ is produced between the anode and cathode terminals of the diode 18 in proportion to a temperature of the diode 18, and therefor, in proportion to a temperature of the silicon substrate 12. Thus, by detecting the forward voltage $V_F$ by the voltage meter 26, it is possible to calculate and measure the temperature of the silicon substrate 12.

In particular, the p-n junction diode 18 exhibits a current-voltage characteristic between the forward voltage $V_F$ and the forward current I, as represented by the following formula:

$$V_F = (kT/q) \times \ln(I/I_S)$$

Herein: k is Boltzmann's constant;
  T is an absolute temperature of the diode 18;
  q is an electron charge; and
  $I_S$ is a saturation current of the diode 18.

Accordingly, it is possible to calculate the temperature T of the diode 18 by the following formula:

$$T = (q/k) V_F [1/[\ln(I/I_S)]]$$

In general, the p-n junction diode 18 per se is small because it is formed as an additional element in the silicon substrate 12, and thus a junction area of the diode 18 is very small. Also, only a linear section of the current-voltage characteristic of the diode 18 is utilized for the temperature measurement. For these reasons, the current, which can be supplied to the diode 18 for the temperature measurement, is considerably small (on the order from several $\mu$A to several hundred $\mu$A). Thus, the constant current source 24 and the voltage meter 26 each must be constituted as an extremely-precise instrument, before the temperature measurement of the silicon substrate 12 can be carried out at high accuracy. Nevertheless, the extremely-precise instruments 24 and 26 are very expensive.

As well known, a plurality of semiconductor devices 10 are produced in bulk by processing a silicon wafer under the same production conditions. Namely, a plurality of silicon substrates 12 are defined as chip areas on the silicon wafer, and each of the chip areas is produced as a semiconductor device by processing the silicon wafer in various ways. Thereafter, the silicon wafer is subjected to a dicing process such that the plurality of semiconductor devices 10 are individually cut and separated from each other. Nevertheless, the p-n junction diodes 18, formed in the silicon wafer, are not identical to each other in the strict sense of the word. Namely, saturation current $I_S$ are different from each other among the p-n junction diodes 18, due to process errors or fluctuations inevitably involved in the production process of the semiconductor devices 10.

Thus, before a precise temperature measurement can be ensured at each of the semiconductor devices 10, it is necessary to calibrate a detected voltage $V_F$ by a calibration formula or calibration table, representing a corresponding relationship between a real temperature (T) and a detected voltage ($V_F$). However, it is relatively troublesome to prepare the calibration formula or table at each of the semiconductor devices 10.

Also, in the first example of the conventional temperature measurement as shown in FIGS. 1 and 2, parasitic resistances are produced between the electrode pads 20 and 22 and the anode and cathode terminals of the p-n junction diode 18, and thus an error is involved in the detected voltage $V_F$, due to voltage drops based the parasitic resistances. Furthermore, the constant current source 24 features a particular offset amount, and the voltage meter 26 also features a particular offset amount. Thus, when the aforesaid calibration formula or calibration table is prepared, the parasitic resistances and the offset amounts must be taken into account, before the accurate temperature measurement can be ensured.

Figure 3:
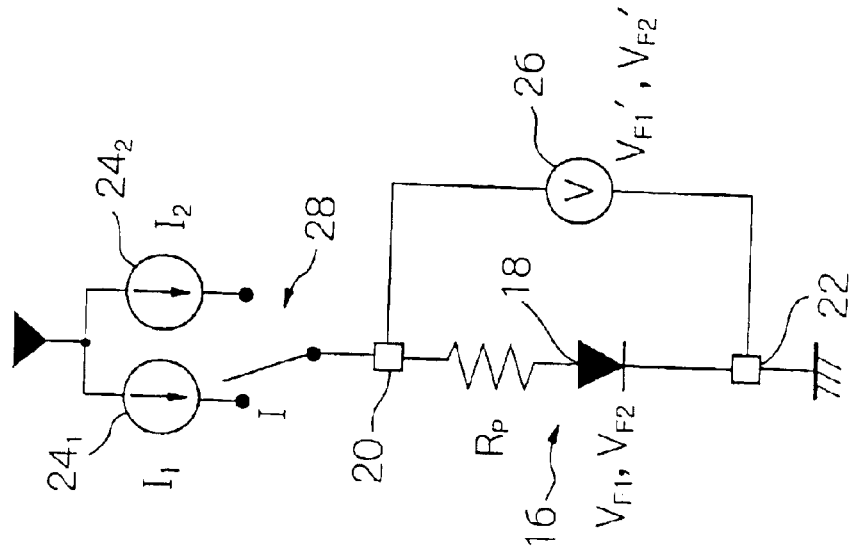
FIG. 3 is a circuit diagram showing a second example of the conventional temperature measuring method using the temperature measuring sensor shown in FIG. 1.

With reference to FIG. 3, a second example of the conventional temperature measuring method using the temperature measuring sensor 16 is conceptually shown, and is representatively disclosed in the above-mentioned U.S. Pat. No. 3,812,717. Note, in FIG. 3, the same references as in FIG. 2 represent the same elements.

As shown in FIG. 3, in the second example, a first constant current source $24_1$ and a second constant current source $24_2$ are prepared, and are selectively connected to the first electrode pad 20 through a switching circuit 28.

First, the switching circuit 28 is operated so that the first electrode pad 20 is connected to the first constant current source $24_1$, and the p-n junction diode 18 is supplied with a forward current $I_1$ from the first constant current source $24_1$. Thus, a forward voltage $V_{F1}$ is produced between the anode and cathode terminals of the diode 18, and is detected by the voltage meter 26. Then, the switching circuit 28 is operated so that the first electrode pad 20 is connected to the second constant current source $24_2$, and the p-n junction diode 18 is supplied with a forward current $I_2$ from the second constant current source $24_2$. Thus, a forward voltage $V_{F2}$ is produced between the anode and cathode terminals of the diode 18, and is detected by the voltage meter 26.

Similar to the aforesaid first example, the respective forward voltages $V_{F1}$ and $V_{F2}$ are represented by the following formulas:

$$V_{F1} = (kT/q)\ln(I_1/I_S) \qquad (1)$$

$$V_{F2} = (kT/q)\ln(I_2/I_S) \qquad (2)$$

In the second example of the conventional temperature measuring method, by subtracting the formula (2) from the formula (1), the terms of "$I_S$" are eliminated, and the temperature T of the silicon substrate 12 is represented by the following formula:

$$T=(q/k)(V_{F1}-V_{F2})[1/[\ln(I_1/I_2)]]$$

Also, in this formula, the offset amount of the voltage meter 26 is eliminated due to the subtraction between the formulas (1) and (2), but offset amounts of the constant current sources $24_1$ and $24_2$ still remain.

In particular, although the first constant current source $24_1$ is set so as to output the forward current $I_1$, a real forward current $I_1'$, which is output from the first constant current source $24_1$, includes an inevitable measurement error component $\Delta I_1$, and a particular offset component $I_{OF1}$ involved in the first constant current source $24_1$. Similarly, although the second constant current source $24_2$ is set so as to output the forward current $I_2$, a real forward current $I_2'$, which is output from the second constant current source $24_2$, includes an inevitable measurement error component $\Delta I_2$, and a particular offset component $I_{OF2}$ involved in the second constant current source $24_2$. Namely, the real currents $I_1'$ and $I_2'$ are represented by the following formulas:

$$I_1'=I_1+\Delta I_1+I_{OF1}$$

$$I_2'=I_2+\Delta I_2+I_{OF2}$$

Also, although the forward voltage $V_{F1}$ should be produced when supplying the forward current $I_1$ to the p-n junction diode 18, a real forward voltage $V_{F1}'$, which is detected by the voltage meter 26, includes an inevitable measurement error component $\Delta V_1$, and a particular offset component $V_{OF}$ involved in the voltage meter 26. Similarly, although the forward voltage $V_{F2}$ should be produced when supplying the forward current $I_2$ to the p-n junction diode 18, a real forward voltage $V_{F2}'$, which is detected by the voltage meter 26, includes an inevitable measurement error component $\Delta V_2$, and the aforesaid particular offset component $V_{OF}$. Namely, the real forward voltages $V_{F1}'$ and $V_{F2}'$ are represented by the following formulas:

$$V_{F1}'=V_{F1}+\Delta V_{F1}+V_{OF}$$

$$V_{F2}'=V_{F2}+\Delta V_{F2}+V_{OF}$$

Thus, a temperature T' of the p-n junction diode 18, and therefore, the silicon substrate 12, which is calculated based on the detected voltages $V_{F1}'$ and $V_{F2}'$, is represented by the following formula:

$$\begin{aligned}T' &= (q/k)(V_{F1}' - V_{F2}')[1/[\ln(I_1'/I_2')]] \quad (3)\\ &= (q/k)[(V_{F1}+\Delta V_{F1}+V_{0F})-(V_{F2}+\Delta V_{F2}+V_{0F})]\\ &\quad [1/[\ln((I_1+\Delta I_1+I_{0F1})/(I_2+\Delta I_2+I_{0F2}))]]\\ &= (q/k)(V_{F1}-V_{F2})[1/[\ln(I_1/I_2)]][1+(\Delta V_{F1}-\Delta V_{F2})/\\ &\quad (V_{F1}-V_{F2})]E_{I0F}\end{aligned}$$

Note, $E_{I0F} = 1/[1+[\ln[(1+(\Delta I_1/I_1)+(I_{0F1}/I_1))/$
$(1+(\Delta I_2/I_2)+(I_{0F2}/I_2))]]/[\ln(I_1/I_2)]]]$ As is apparent from this formula, although the terms of "$V_{OF}$" are eliminated due to the subtraction between the aforesaid formulas (1) and (2), an error member $E_{IOF}$ including the offset amounts $I_{OF1}$ and $I_{OF2}$ still remains.

Figure 4:
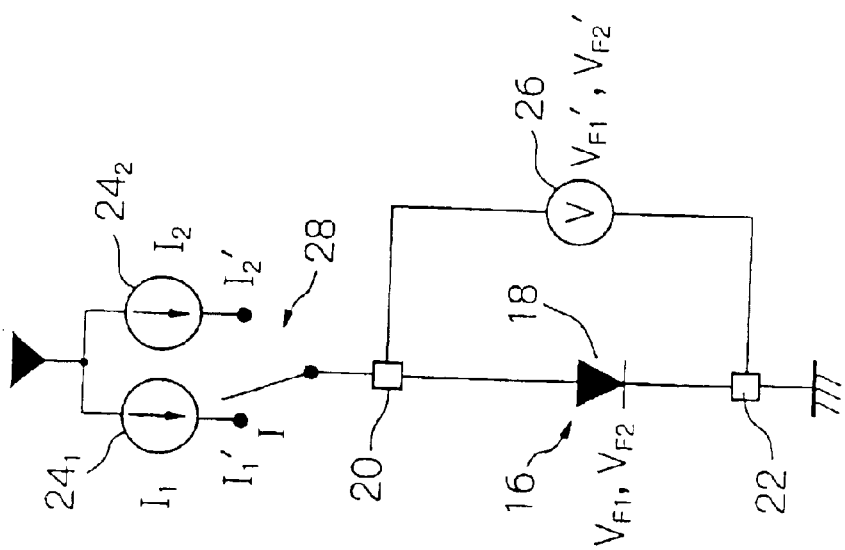
FIG. 4 is a circuit diagram, similar to FIG. 3, for explaining how the conventional temperature measuring method is influenced by a parasitic resistance symbolically shown by way of example therein.

On the other hand, similar to the above-mentioned first example of the conventional temperature measuring method, each of the detected voltages $V_{F1}'$ and $V_{F2}'$ further includes an error component based on the parasitic resistances produced between the electrode pads 20 and 22 and the anode and cathode terminals of the diode 18. With reference to FIG. 4, the parasitic resistances, which are produced between the electrode pad 20 and the anode terminals of the diode 18 and between the electrode pad 22 and the cathode terminals of the diode 18, is symbolically shown by a resistor having a representative parasitic resistance $R_P$. In this case, when the p-n junction diode 18 is supplied with the forward current $I_1$, the real forward voltage $V_{F1}'$, which is detected by the voltage meter 26, further includes an error component based on the parasitic resistance $R_P$. Also, when the diode 18 is supplied with the forward current $I_2$, the real forward voltage $V_{F2}'$, which is detected by the voltage meter 26, further includes an error component based on the parasitic resistance $R_P$. Namely, when the error components based on the parasitic resistance $R_P$ are taken into account, the real forward voltages $V_{F1}'$ and $V_{F2}'$ are represented by the following formulas:

$$V_{F1}'=V_{F1}+I_1R_P$$

$$V_{F2}'=V_{F2}+I_2R_P$$

Thus, a temperature T' of the p-n junction diode 18, and therefore, the silicon substrate 12, which is calculated based on the detected voltages $V_{F1}'$ and $V_{F2}'$, is represented by the following formula:

$$\begin{aligned}T' &= (q/k)(V_{F1}'-V_{F2}')[1/[\ln(I_1/I_2)]]\\ &= (q/k)(V_{F1}+I_1R_P-V_{F2}-I_2R_P)[1/[\ln(I_1/I_2)]]\\ &= (q/k)(V_{F1}-V_{F2})[1/[\ln(I_1/I_2)]]+E_{PR}\end{aligned}$$

Note, $E_{PR} = (q/k)(I_1-I_2)R_P[1/[\ln(I_1/I_2)]]$

Thus, in this formula, an error member $E_{RP}$ including the parasitic resistance $R_P$ remains.

As is apparent from the foregoing, the representative examples of the conventional temperature measuring method fail to precisely measure the operational temperature of the semiconductor device.

Figure 5:
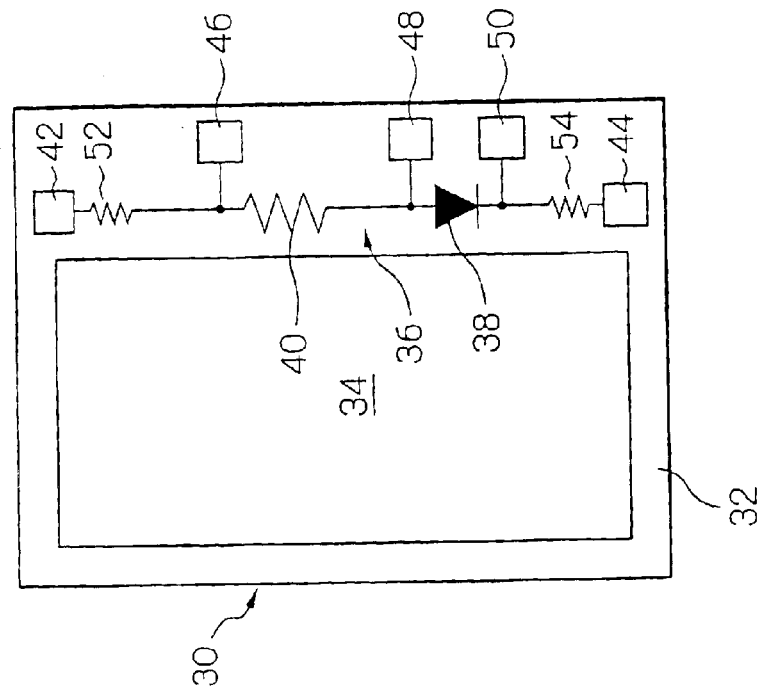
FIG. 5 is a conceptual plan view of a first embodiment of a semiconductor device containing a temperature measuring sensor according to the present invention.

FIG. 5 shows a first embodiment of a semiconductor device according to the present invention, which is generally indicated by reference 30. The semiconductor device 30 comprises a silicon substrate 32, and a main circuit section 34 defined on the silicon substrate 32, and the main circuit section 34 includes various circuits which are arranged so that the semiconductor device 30 functions as a central processing unit, a microprocessing unit, a digital signal processor or the like.

As shown in FIG. 5, the semiconductor device 30 contains a temperature measuring sensor 36 incorporated therein. Namely, the temperature measuring sensor 36 comprises a p-n junction diode 38 formed in the silicon substrate 32, a resistor 40 formed in the silicon substrate 32 and connected to the diode 38 in series, and first, second, third, fourth, and fifth electrode pads 42, 44, 46, 48, and 50 formed on the silicon substrate 32 and associated with the diode 38 and the resistor 40.

In particular, an anode terminal of the p-n junction diode 38 is connected to one end of the resistor 40, and then the other end of the resistor 40 is connected to the first electrode pad 42. On the other hand, a cathode terminal of the diode 38 is connected to the second electrode pad 44. Also, the third electrode pad 46 is connected to a conductive lead extending between the resistor 40 and the first electrode pad 42 at a location in the vicinity of the resistor 40. Further, the fourth electrode pad 48 is connected to a conductive lead extending between the diode 38 and the resistor 40 at a location in the vicinity of the anode terminal of the diode 38, and the fifth electrode pad 50 is connected to a conductive lead extending between the diode 38 and the second electrode pad 44 at a location in the vicinity of the cathode terminal of the diode 38.

Note, in FIG. 5, a parasitic resistance produced between the first electrode pad 42 and the resistor 40 is symbolically and representatively shown, as indicated by reference 52, and a parasitic resistance produced between the diode 38 and the second electrode pad 44 is symbolically and representatively shown, as indicated by reference 54.

Figure 6:
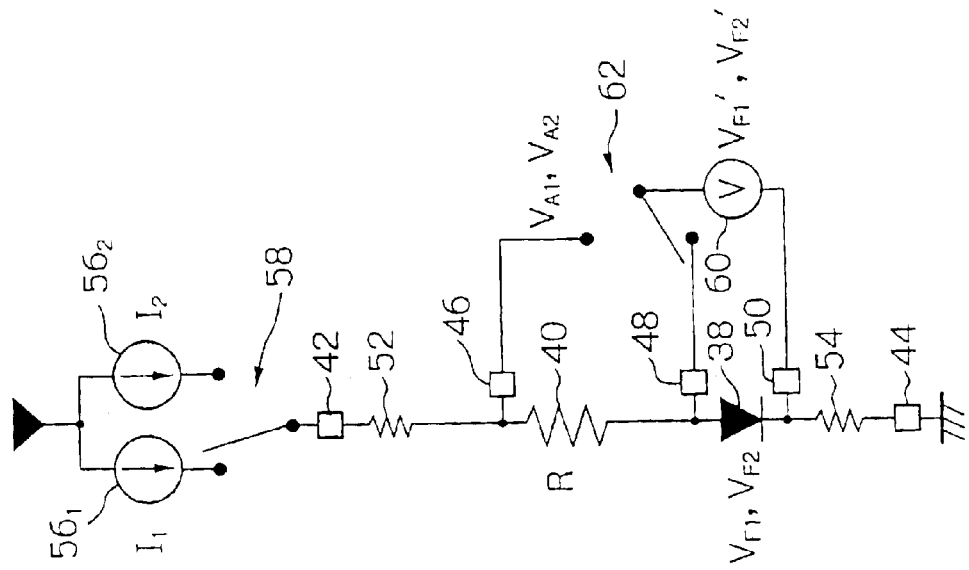
FIG. 6 is a circuit diagram showing a temperature measuring method using the temperature measuring sensor shown in FIG. 5.

With reference to FIG. 6, a temperature measuring method using the temperature measuring sensor 36, according to the present invention, is conceptually shown.

Similar to the above-mentioned second example of the conventional temperature measuring method, according to the temperature measuring method according to the present invention, a first constant current source $56_1$ and a second constant current source $56_2$ are prepared, and are selectively connected to the first electrode pad 42 through a switching circuit 58, and the second electrode pad 44 is grounded.

Also, as shown in FIG. 6, a voltage meter 60 is prepared to detect a voltage drop produced in the resistor 40 and a voltage produced at the p-n junction diode 38. Namely, the third and fourth electrode pads 46 and 48 are selectively connected to the voltage meter 60 through a switching circuit 62, with the fifth electrode pad 50 being connected to the voltage meter 60.

First, the switching circuit 58 is operated so that the first electrode pad 42 is connected to the first constant current source $56_1$, and the p-n junction diode 38 and the resistor 40 are supplied with a forward current $I_1$ from the first constant current source $56_1$. On the other hand, the switching circuit 62 is operated so that the third electrode pad 46 is connected to the voltage meter 60, and thus a voltage $V_{A1}$ is produced between the third and fifth electrode pads 46 and 50, and is detected by the voltage meter 60. Then, the switching circuit 62 is operated so that the fourth electrode pad 48 is connected to the voltage meter 60, and thus a forward voltage $V_{F1}$ is produced between the anode and cathode terminals of the p-n junction diode 38, and is detected by the voltage meter 60.

Subsequently, the switching circuit 58 is operated so that the first electrode pad 42 is connected to the second constant current source $56_2$, and the p-n junction diode 38 and the resistor 40 are supplied with a forward current $I_2$ from the second constant current source $56_2$. On the other hand, the switching circuit 62 is operated so that the third electrode pad 46 is connected to the voltage meter 60, and thus a voltage $V_{A2}$ is produced between the third and fifth electrode pads 46 and 50, and is detected by the voltage meter 60. Then, the switching circuit 62 is operated so that the fourth electrode pad 48 is connected to the voltage meter 60, and thus a forward voltage $V_{F2}$ is produced between the anode and cathode terminals of the p-n junction diode 38, and is detected by the voltage meter 60.

Accordingly, when the resistor 40 features a resistance R, the forward currents $I_1$ and $I_2$ are represented by the following formulas:

$$I_1 = (V_{A1} - V_{F1})/R$$

$$I_2 = (V_{A2} - V_{F2})/R$$

Thus, the current ratio $(I_1/I_2)$ is represented by the following formula:

$$I_1/I_2 = [(V_{A1}-V_{F1})/R]/[(V_{A2}-V_{F2})/R] = (V_{A1}-V_{F1})/(V_{A2}-V_{F2})$$

Similar to the aforesaid second example (FIG. 4) of the conventional temperature measuring method, a temperature T of the silicon substrate 32 is represented by the following formula:

$$T = (q/k)(V_{F1}-V_{F2})[1/[\ln(I_1-I_2)]]$$

Of course, herein:

k is Boltzmann's constant;

T is an absolute temperature of the diode 38;

q is an electron charge; and $I_S$ is a saturation current of the diode 38.

By substituting the member $((V_{A1}-V_{F1})/(V_{A2}-V_{F2}))$ for the current ratio $(I_1/I_2)$, the aforesaid formula is deformed as follows:

$$T = (q/k)(V_{F1}-V_{F2})[1/[\ln((V_{A1}-V_{F1})/(V_{A2}-V_{F2}))]]$$

As is apparent from this formula, the terms of "$I_1$" and "$I_2$" are eliminated. Namely, according to the present invention, although the respective constant current sources $56_1$ and $56_2$ have particular offset amounts, the measurement error component based on the offset amounts of the constant current sources $56_1$ and $56_2$ can be removed from the measured temperature T. Also, since the terms of "R" are eliminated from the aforesaid formula, it is unnecessary to take an absolute precision of the resistor 40 into account.

Nevertheless, measurement errors are inevitably involved in the temperature measurement according to the present invention.

In particular, although the voltage $V_{A1}$ should be produced when supplying the forward current $I_1$ to the p-n junction diode 38 and the resistor 40, a real voltage $V_{A1}'$, which is detected by the voltage meter 60, includes an inevitable measurement error component $\Delta V_{A1}$, and a particular offset component $V_{OF}$ involved in the voltage meter 60. Similarly, although the voltage $V_{A2}$ should be produced when supplying the forward current $I_2$ to the p-n junction diode 38 and the resistor 40, a real forward voltage $V_{V2}'$, which is detected by the voltage meter 60, includes an inevitable error component $\Delta V_{A2}$, and the aforesaid particular offset component $V_{OF}$. Namely, the real voltages $V_{A1}'$ and $V_{A2}'$ are represented by the following formulas:

$$V_{A1}' = V_{A1} + \Delta V_{A1} + V_{OF}$$

$$V_{A2}' = V_{A2} + \Delta V_{A2} + V_{OF}$$

Also, although the forward voltage $V_{F1}$ should be produced when supplying the forward current $I_1$ to the p-n junction diode 38, a real forward voltage $V_{F1}'$, which is detected by the voltage meter 60, includes an inevitable measurement error component $\Delta V_1$, and the aforesaid particular offset component $V_{OF}$. Similarly, although the forward voltage $V_{F2}$ should be produced when supplying the forward current $I_2$ to the p-n junction diode 38, a real forward voltage $V_{F2}'$, which is detected by the voltage meter 26 includes an inevitable error component $\Delta V_2$, and the aforesaid particular offset component $V_{OF}$. Namely, the real forward voltages $V_{F1}'$ and $V_{F2}'$ are represented by the following formulas:

$$V_{F1}' = V_{F1} + \Delta V_{F1} + V_{OF}$$

$$V_{F2}' = V_{F2} + \Delta V_{F2} + V_{OF}$$

Thus, a temperature T' of the p-n junction diode 38, and therefore, the silicon substrate 32, which is calculated based on the detected voltages $V_{A1}'$, $V_{F2}'$, $V_{F1}'$, and $V_{F2}'$, is represented by the following formula:

$$T' = (q/k)(V_{F1}' - V_{F2}')[1/[\ln((V_{A1}' - V_{F1}')/(V_{A2}' - V_{F2}'))]] \quad (4)$$

$$= (q/k)[(V_{F1} + \Delta V_{F1} + V_{0F}) - (V_{F2} + \Delta V_{F2} + V_{0F})] \times$$

$$[1/[\ln(((V_{A1} + \Delta V_{A1} + V_{0F}) - (V_{F1} + \Delta V_{F1} + V_{0F}))/$$

$$((V_{A2} + \Delta V_{A2} + V_{0F}) - (V_{F2} + \Delta V_{F2} + V_{0F})))]]$$

$$= (q/k)(V_{F1} - V_{F2} + (\Delta V_{F1} - \Delta V_{F2}))$$

$$[1/[\ln(V_{A1} - V_{F1} + (\Delta V_{A1} - \Delta V_{F1}))/$$

$$(V_{A2} - V_{F2} + (\Delta V_{A2} - \Delta V_{F2}))]]$$

$$= (q/k)(V_{F1} - V_{F2})[1/[\ln(V_{A1} - V_{F1})/(V_{A2} - V_{F2})]]E_V$$

Note, $E_V = [1 + (\Delta V_{F1} - \Delta V_{F2})/(V_{F1} - V_{F2})] \times$ $$[1/[1 + [\ln((1 + (\Delta V_{A1} - \Delta V_{F1})/(V_{A1} - V_{F1}))/$$

$$(1 + (\Delta V_{A2} - \Delta V_{F2})/(V_{A2} - V_{F2})))]/$$

$$[\ln((V_{A1} - V_{F1})/(V_{A2} - V_{F2}))]]]$$

Although this formula (4) has an error member $E_V$ including the measurement error components $\Delta V_{A1}$, $\Delta V_{A2}$, $\Delta V_{F1}$, and $\Delta V_{F2}$, using the formula (4), it is possible to more precisely calculate the temperature T of the silicon substrate 32 in comparison with the aforesaid conventional formula (3), as stated below.

Figure 7:
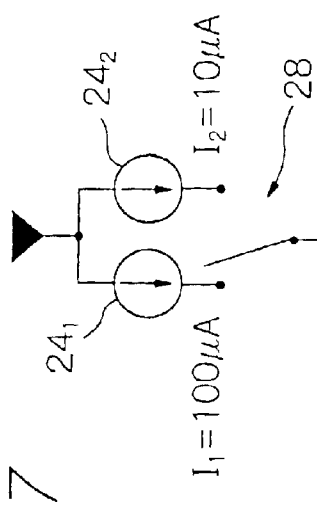
FIG. 7 is a circuit diagram, similar to FIG. 3, showing various conditions, under which an error calculation is carried out in accordance with the second example of the conventional temperature measuring method.

First, using the aforesaid conventional formula (3), an error calculation was carried out under the conditions shown in FIG. 7. In this error calculation, provided that a usual analog tester is used, a setting of ±0.2%+15 nA was given as a current accuracy, and a setting of ±70 ppm+19 $\mu$V was given as a voltage measurement accuracy. Also, as shown in FIG. 7, a setting of 100 $\mu$A was given as a current $I_1$ output from the first constant current source $24_1$, and a setting of 10 $\mu$A was given as a current $I_2$ output from the second constant current source $24_2$. Namely, the current ratio ($I_1/I_2$) was 10/1. Further, when a temperature T of the diode 18 was 100° C., and when the diode 18 was supplied with the respective currents $I_1$ and $I_2$, it was assumed that 0.62 V and 0.6 V are produced as forward voltages $V_{F1}$ and $V_{F2}$ in the diode 18. Furthermore, it was assumed that respective parasitic resistances of 1 Ω are produced between the first electrode pad 20 and the diode 18 and between the diode 18 and the second electrode pad 22.

The result of the error calculation based on the aforesaid conventional formula (3) was ±0.49%. When this calculated result is converted into a temperature, it is equivalent to ±1.85° C.

Figure 8:
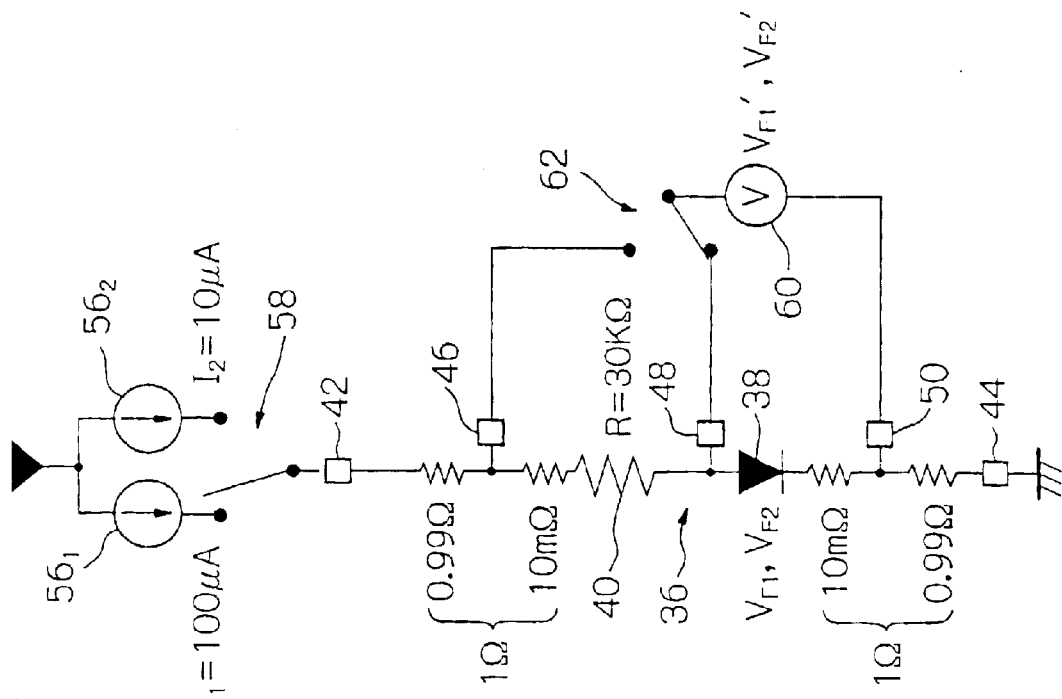
FIG. 8 is a circuit diagram, similar to FIG. 6, showing various conditions, under which an error calculation is carried out in accordance with the temperature measuring method according to the present invention.

Similarly, using the aforesaid formula (4) according to the present invention, an error calculation was carried out under the conditions shown in FIG. 8. The conditions shown in FIG. 8 are substantially identical to those of FIG. 7 except for the following items (a), (b), and (c):

(a) A setting of 30 KΩ was given the resistance R of the resistor 40;

(b) Although it was assumed that a parasitic resistance of 1 Ω is produced between the first electrode pad 42 and the resistor 40, it was divided into the resistance of 0.99 Ω and the resistance of 10 mΩ, because the third electrode pad 46 is connected to the conductive lead extending between the first electrode pad 42 and the resistor 40 at the location in the vicinity of the resistor 40;

(c) Although it was assumed that a parasitic resistance of 1 Ω is produced between the diode 38 and the second electrode pad 44, it was divided into the resistance of 0.99 Ω and the resistance of 10 mΩ, because the fifth electrode pad 50 is connected to the conductive lead extending between the diode 38 and the second electrode pad 44 at the location in the vicinity of the cathode terminal of the diode 38.

The result of the error calculation based on the aforesaid formula (4) according to the present invention was ±0.06%. When this calculated result is converted into a temperature, it is equivalent to ±0.23° C.

As is apparent from the comparison of the results of the error calculations, the precision of the temperature measurement of the semiconductor device can be considerably improved.

In the temperature measuring method according to the present invention, it is preferable to make the current ratio ($I_1/I_2$) larger because it is possible to more precisely detect a difference of the forward voltages $V_{F1}$ and $V_{F2}$. However, when the current $I_1$ is too large, the detection of the forward voltage $V_{F1}$ is subjected to a negative influence due to a resistance component of the diode 38. Also, when the current $I_2$ is too small, the detection of the forward voltage $V_{F2}$ is subjected to a negative influence due to a leakage current of the diode 38. In short, since a linear section of the current-voltage characteristic of the diode 38 is utilized for the temperature measurement, the current ratio ($I_1/I_2$) should be selected based on an extent of the linear section of the current-voltage characteristic of the diode 38. Usually, the current ratio ($I_1/I_2$) falls in a range between 8/1 and 30/1.

The temperature measuring sensor 36 according to the present invention features the p-n junction diode 38 associated with the resistor 40. Namely, since the respective currents $I_1$ and $I_2$ are converted into the voltage drops $I_1 \times R$ and $I_2 \times R$, the precision of the temperature measurement of the silicon substrate 32 is not affected by the accuracy of the currents $I_1$ and $I_2$ per se. Namely, as long as each of the currents $I_1$ and $I_2$ is constant, it is unnecessary to precisely set each of the currents $I_1$ and $I_2$.

Also, in the temperature measuring method according to the present invention, since the terms of "$I_S$" and "$V_{OF}$" are eliminated from the aforesaid formula (4), it is possible to directly and precisely determine the temperature of the silicon substrate 32 on the basis of the detected forward voltages $V_{F1}'$ and $V_{F2}'$, without any calibration of these detected forward voltages. Accordingly, it is unnecessary to prepare a calibration formula or calibration table, representing a corresponding relationship between real temperatures of the silicon substrates 32 and detected forward voltages of the diode 18. Namely, the temperature measuring sensor 36 according to the present invention can be utilized as a real temperature measuring sensor.

Figure 9:
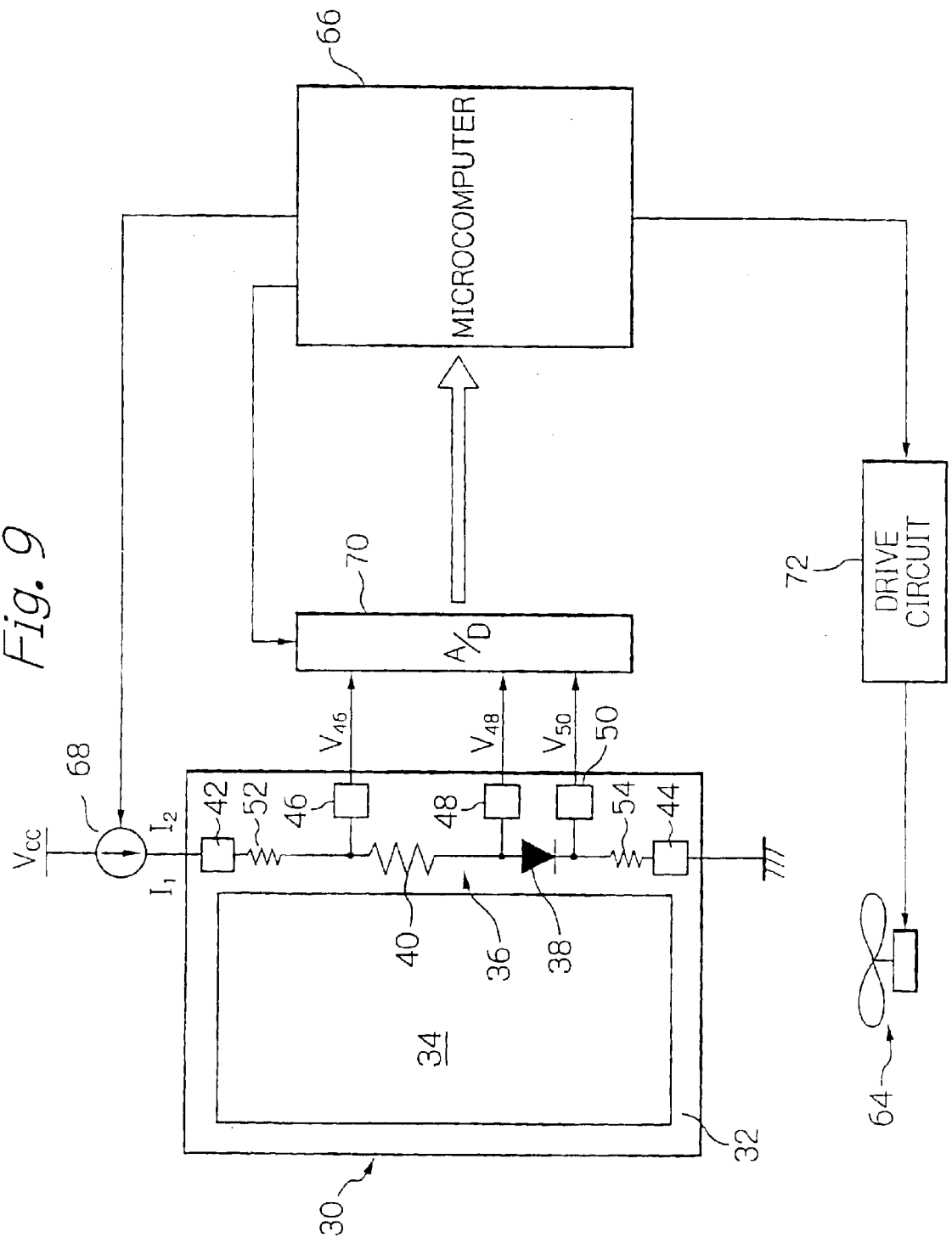
FIG. 9 is a block diagram showing an embodiment of a temperature management system for managing a temperature of the semiconductor device shown in FIG. 5.

With reference to FIG. 9, an embodiment of a temperature management system for managing a temperature of the semiconductor device 30 is illustrated. In this embodiment, the semiconductor device 30 is mounted on a motherboard provided in a suitable electronic product, such as a personal computer, and is provided with a cooling fan 64.

As shown in FIG. 9, the temperature management system includes a microcomputer 66 having a central processing unit (CPU), a read-only memory (ROM) for storing programs and constants, a random-access memory (RAM) for storing temporary data, and an input/output (I/O) interface circuit.

The temperature management system also includes a constant current source 68, which is constituted so as to selectively output one of the constant currents $I_1$ and $I_2$ under control of the microcomputer 66. As shown in FIG. 9, the first electrode pad 42 is connected to the constant current source 68, and the second electrode pad 44 is grounded. The temperature management system further includes an analog-to-digital (A/D) converter 70, which detects voltages $V_{46}$, $V_{48}$, and $V_{50}$ of the third, fourth and fifth electrode pads 46, 48 and 50 as digital data under control of the microcomputer 66, while one of the constant currents $I_1$ and $I_2$ is supplied to the temperature measuring sensor 36 comprising the p-n junction diode 38 and the resistor 40. Furthermore, the temperature management system is provided with a drive circuit 72 for driving the cooling fan 64, and the drive circuit 72 is operated under control of the microcomputer 66.

Figure 10:
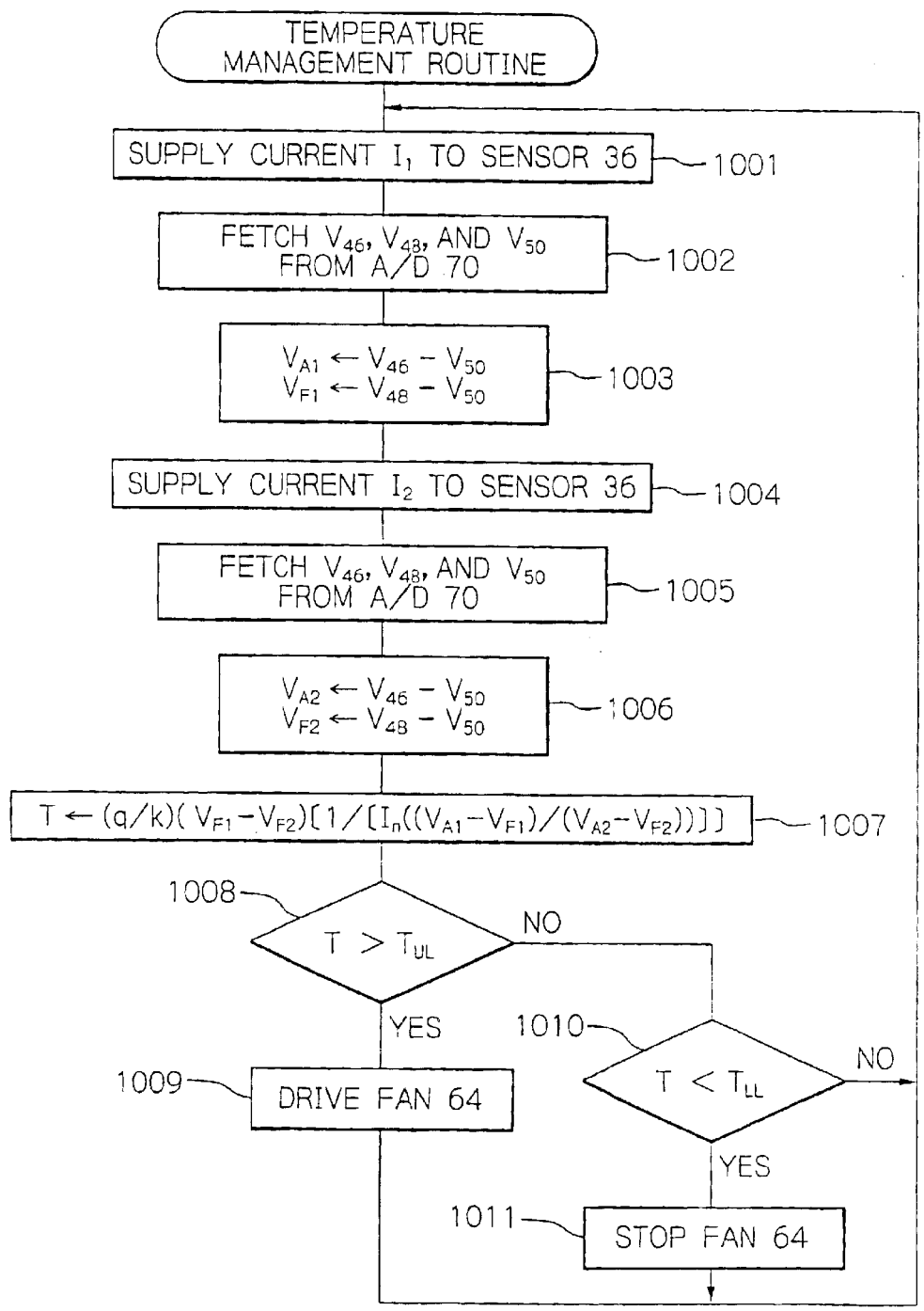
FIG. 10 is a flowchart of a temperature management routine which is executed in a microcomputer included in the temperature management system shown in FIG. 9.

FIG. 10 shows a flowchart of a temperature management routine executed in the microcomputer 66. The execution of this routine is started after the electronic product, such as a personal computer, is powered ON.

At step 1001, the constant current $I_1$ is supplied from the constant current source 68 to the temperature measuring sensor 36 including the p-n junction diode 38 and the resistor 40. Then, at step 1002, voltages $V_{46}$, $V_{48}$, and $V_{50}$ of the third, fourth and fifth electrode pads 46, 48 and 50 are successively fetched as digital voltage data through the A/D converter 70.

At step 1003, the following calculations are carried out on the basis of the fetched digital voltage data $V_{46}$, $V_{48}$, and $V_{50}$:

$$V_{A1} \leftarrow V_{46} - V_{50}$$

$$V_{F1} \leftarrow V_{48} - V_{50}$$

Namely, while the temperature measuring sensor 36 is supplied with the constant current $I_1$, the potential difference $V_{A1}$ is calculated between the third and fifth electrode pads 46 and 50, and the potential difference $V_{F1}$ is calculated between the fourth and fifth electrode pads 48 and 50.

At step 1004, the constant current $I_2$ is supplied from the constant current source 68 to the temperature measuring sensor 36 including the p-n junction diode 38 and the resistor 40. Then, at step 1005, voltages $V_{46}$, $V_{48}$, and $V_{50}$ of the third, fourth and fifth electrode pads 46, 48 and 50 are successively fetched as digital voltage data through the A/D converter 70.

At step 1006, the following calculations are carried out on the basis of the fetched digital voltage data $V_{46}$, $V_{48}$, and $V_{50}$:

$$V_{A2} \leftarrow V_{46} - V_{50}$$

$$V_{F2} \leftarrow V_{48} - V_{50}$$

Namely, while the temperature measuring sensor 36 is supplied with the constant current $I_2$, the potential difference $V_{A2}$ is calculated between the third and fifth electrode pads 46 and 50, and the potential difference $V_{F2}$ is calculated between the fourth and fifth electrode pads 48 and 50.

At step 1007, the following calculation is carried out on the basis of the calculated potential differences $V_{A1}$, $V_{F1}$, $V_{A2}$ and $V_{F2}$:

$$T = (q/k)(V_{F1} - V_{F2})[1/[\ln((V_{A1} - V_{F1})/(V_{A2} - V_{F2}))]]$$

Herein: k is Boltzmann's constant;

T is an absolute temperature of the diode 38; and q is an electron charge.

Note, of course, a temperature of the semiconductor device 34 is represented by the temperature T of the silicon substrate 32.

At step 1008, it is monitored whether the calculated temperature T has exceeded a predetermined upper temperature limit $T_{UL}$. Note, the upper temperature limit $T_{UL}$ is selected as a temperature lower than a temperature which causes a thermal runaway in the semiconductor device 30.

At step 1008, if $T > T_{UL}$, the control proceeds to step 1009, in which the cooling fan 64 is driven to cool the semiconductor device 30. Then, the control returns to step 1001.

On the other hand, at step 1008, if $T \leq T_{UL}$, the control proceeds to step 1010, in which it is monitored whether or not the calculated temperature T has fallen below a predetermined lower temperature limit $T_{LL}$. Note, the lower temperature limit $T_{LL}$ is suitably selected as a temperature sufficiently lower than the aforesaid upper temperature limit $T_{UL}$.

At step 1010, if $T < T_{LL}$, the control proceeds to step 1011, in which the driving of the cooling fan 64 is stopped. Then, the control returns to step 1001. At step 1010, if $T \geq T_{LL}$, the control immediately returns to step 1001.

In this temperature management system, although the driving of the cooling fan 64 is controlled in accordance with the temperature measurement of the semiconductor device 30, a frequency of basic clock pulses for operating the semiconductor device 30 may be controlled. For example, when the calculated temperature T exceeds the upper temperature limit $T_{UL}$, by lowering the frequency of the basic clock pulses, it is possible to lower the temperature of the semiconductor device 30.

Also, in the temperature management system shown in FIG. 9, although each of the microcomputer 66, the constant current source 68, and the A/D converter 70 is provided at the exterior of the semiconductor device 30, each element (66, 68, 70) may be formed and incorporated in the silicon substrate 32 of the semiconductor device 30.

Figure 11:
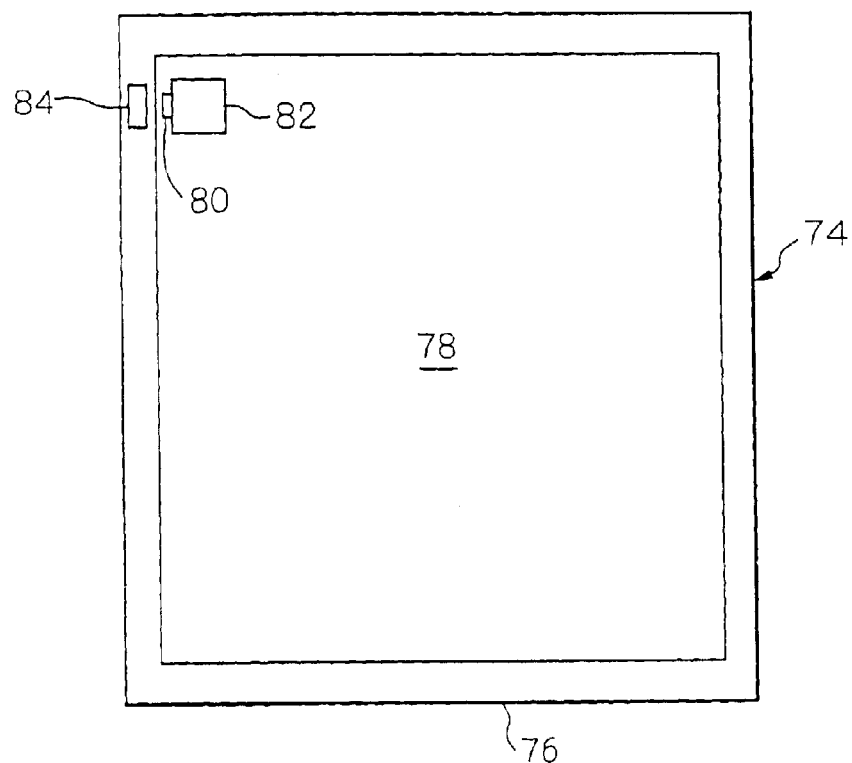
FIG. 11 is a conceptual plan view of a second embodiment of the semiconductor device according to the present invention, which contains an internal temperature management system including a conventional type temperature measuring sensor and a temperature calibration circuit associated with each other, and an additional temperature measuring sensor constituted according to the present invention, to prepare calibration data used in the calibration circuit.

FIG. 11 shows a second embodiment of the semiconductor device according to the present invention, which is generally indicated by reference 74. Similar to the aforesaid first embodiment, the semiconductor device 74 comprises a silicon substrate 76, and a main circuit section 78 defined on the silicon substrate 76, and the main circuit section 78 includes various circuits which are arranged so that the semiconductor device 74 functions as a central processing unit, a microprocessing unit, a digital signal processor or the like.

In this second embodiment, the semiconductor device 74 contains an internal temperature management system, which includes a temperature measuring sensor 80 and a temperature calibration circuit 82 associated with each other and provided in the main circuit section 78. The semiconductor device 74 further contains an additional temperature measuring sensor 84 formed in the silicon substrate 76 in the vicinity of the temperature measuring sensor 80. As shown in FIG. 11, although the additional temperature measuring sensor 84 is disposed at a margin area of the silicon substrate 76, it may be provided in the main circuit section 78, if necessary.

Figure 12:
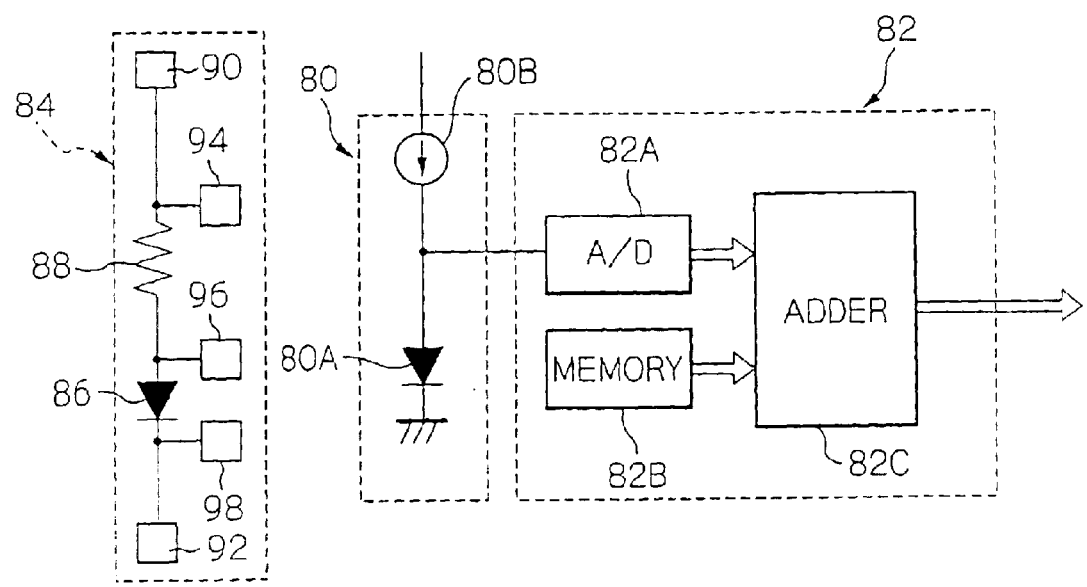
FIG. 12 is circuit diagrams of the conventional type temperature measuring sensor, temperature calibration circuit associated with each other, and an additional temperature measuring sensor shown in FIG. 11.

As is apparent from FIG. 12, the temperature measuring sensor 80 is constituted as a conventional type of temperature measuring sensor, as shown in FIGS. 1 and 2. Namely, the temperature measuring sensor 80 comprises a p-n junction diode 80A formed in the silicon substrate 76, and a constant current source 80B for supplying a constant current to the p-n junction diode 80A. As already discussed above, it is necessary to calibrate a voltage detected by the conventional temperature measuring sensor 80, before a precise temperature measurement can be ensured at the semiconductor device 74.

Thus, the temperature measuring sensor 80 is associated with the temperature calibration circuit 82. As shown in FIG.

12, the temperature calibration circuit 82 has an analog-to-digital (A/D) converter 82A, an electrically erasable programmable read only memory (so-called flash memory) 82B, and an adder 82C. The A/D converter 82A detects a forward voltage, produced in the p-n junction diode 80A, as digital voltage data, while the diode 80A is supplied with the constant current from the constant current source 80B, and the detected digital voltage data is output to the adder 82C. The flash memory 82B stores calibration data, and the calibration data is output from the flash memory 82B to the adder 82C, which calibrates the detected digital voltage data with the calibration data.

In this embodiment, the additional temperature measuring sensor 84 is used to prepare the calibration data to be stored in the flash memory 82B, as stated in detail hereinafter.

As shown in FIG. 12, the additional temperature measuring sensor 84 is constituted according to the present invention. Namely, the additional temperature measuring sensor 84 comprises a p-n junction diode 86 formed in the silicon substrate 76, a resistor 88 formed in the silicon substrate 76 and connected to the p-n junction diode 86 in series, and first, second, third, fourth, and fifth electrode pads 90, 92, 94, 96, and 98 formed on the silicon substrate 76 and associated with the diode 86 and the resistor 88.

In particular, an anode terminal of the p-n junction diode 86 is connected to one end of the resistor 88, and then the other end of the resistor 88 is connected to the first electrode pad 90. On the other hand, a cathode terminal of the diode 86 is connected to the second electrode pad 92. Also, the third electrode pad 94 is connected to a conductive lead extending between the resistor 88 and the first electrode pad 90 at a location in the vicinity of the resistor 88. Further, the fourth electrode pad 96 is connected to a conductive lead extending between the diode 86 and the resistor 88 at a location in the vicinity of the anode terminal of the diode 86, and the fifth electrode pad 98 is connected to a conductive lead extending between the diode 86 and the second electrode pad 92 at a location in the vicinity of the cathode terminal of the diode 98. Thus, similar to the case shown in FIGS. 5 and 6, it is possible to carry out a temperature measurement of the semiconductor device 74 without being substantially affected by the parasitic resistances produced between the first electrode pad 90 and the resistor 88 and between the diode 86 and the second electrode pad 92.

Incidentally, a plurality of semiconductor devices 74 are produced in bulk by processing a silicon wafer under the same production conditions Namely, a plurality of silicon substrates 76 are defined as chip areas on the silicon wafer, and each of the chip areas is produced as a semiconductor device by processing the silicon wafer in various well known ways. The processed silicon wafer is tested by a test system, which is frequently called an LSI tester. In this embodiment, the preparation of the calibration data and the storage of the calibration data in the flash memory 82B are carried out by utilizing the test system.

Figure 13:
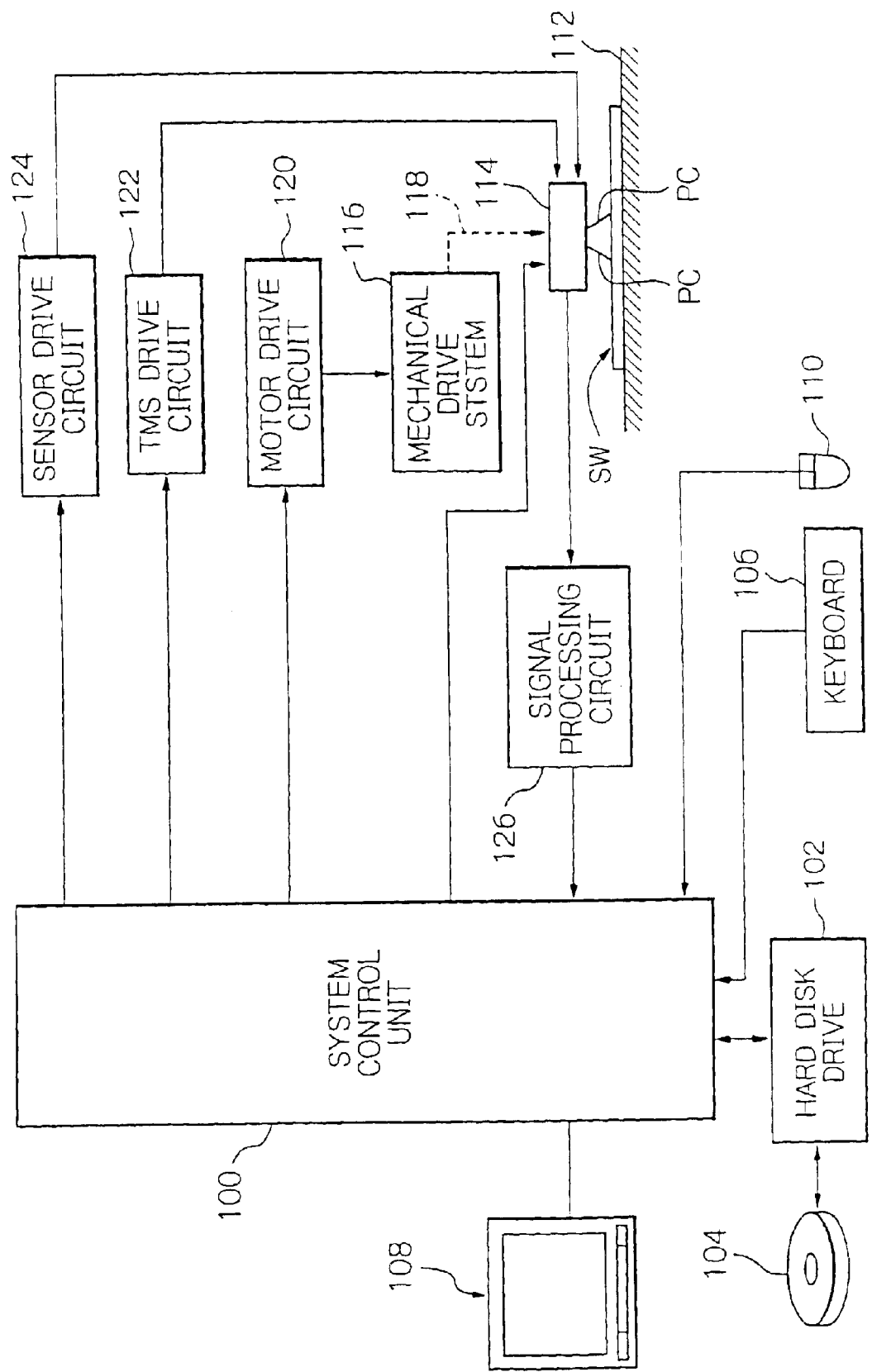
FIG. 13 is a block diagram of a test system for testing a plurality of semiconductor devices formed in a silicon wafer, which is utilized to prepare and store the calibration data in a memory included in the calibration circuit.

With reference to FIG. 13, the aforesaid test system is illustrated as an block diagram. As illustrated, the test system comprises a system control unit 100 which contains a microcomputer having a central processing unit (CPU), a read-only memory (ROM) for storing programs and constants, a random-access memory (RAM) for storing temporary data, and an input/output (I/O) interface circuit.

The test system also comprises a hard disk drive 102 for driving a hard disk 104 on which various programs, various data and so on are stored. The system control unit 100 writes the various programs and various data on the hard disk 104 through the hard disk drive 102, and also reads them from the hard disk 104 through the hard disk drive 102, if necessary.

The test system further comprises a keyboard 106 for inputting various commands and data to the system control unit 100 though the I/O interface circuit thereof. The test system is also provided with a display unit (CRT or LCD) 108 for displaying various command items, various information data and so on, and a mouse 110 for inputting a command to the system control unit 100 by clicking the mouse 110 on any one of the command items displayed on the display unit 108.

As shown in FIG. 13, the test system is provided with a test stage 112 on which a silicon wafer SW is placed. Although not shown in FIG. 13, the test stage 112 is associated with an automatic wafer transferring/positioning system, by which the silicon wafer SW is transferred to and positioned at the predetermined position on the test stage 112, and is removed therefrom after the test is completed.

The test system includes a movable test head 114 having a plurality of probe contacts PC, and the test head 114 is driven and moved by a mechanical drive system 116. Namely, the mechanical drive system 116 contains a drive mechanism to which the test head 114 is mechanically and movably connected, and electric drive motors for driving the drive mechanism to thereby move the test head 114. Note, in FIG. 13, the mechanical and movable connection of the test head 114 to the drive mechanism is symbolically and conceptually represented by an arrow-headed broken line 118. The drive motors of the mechanical drive system 116 are driven by a motor drive circuit 120 which is operated under control of the system control unit 100. Namely, the movement of the test head 114 is controlled by the system control unit 100 through the motor drive circuit 120.

Although not illustrated in FIG. 11, each of the semiconductor devices 74 on the silicon wafer SW has a plurality of electrode pads formed thereon. When the test head 114 is positioned in place with respect to one of the semiconductor devices 74 on the silicon wafer SW, the probe contacts PC of the test head 114 are contacted to some of the electrode pads of the semiconductor device 74.

As already stated above, the test system is utilized to carry out the preparation of the calibration data and the storage of the calibration data in the flash memory 82B. Namely, the test system is constituted so as to be modified as a system for preparing and storing the calibration data in the flash memory 82B. To this end, the test system is provided with a temperature-management-system (TMS) drive circuit 122 for driving the internal temperature management system including the temperature measuring sensor 80 and the temperature calibration circuit 82, and a sensor drive circuit 124 for driving the additional temperature measuring sensor 84, and each of these drive circuits 122 and 124 is operated under the system control unit 100. In short, the TMS drive circuit 122 is electrically connected to the temperature measuring sensor 80 and the temperature calibration circuit 82 through some probe contacts PC of the test head 114, and the sensor drive circuit 124 is also electrically connected to the additional temperature measuring sensor 84 through some probes of the test head 114.

Also, the test system is provided with a signal processing circuit 126 for processing signals output from the temperature measuring sensor 80, the temperature calibration circuit 82, and the additional temperature measuring sensor 84. Namely, the signal processing circuit 126 is electrically connected to the temperature measuring sensor 80, the temperature calibration circuit 82, and the additional temperature measuring sensor 84 through some probes of the test head 114. Further, the system control unit 100 is electrically connected to the flash memory 82B of the temperature calibration circuit 82 through some probe contacts PC of the test head 114, whereby data are stored in the flash memory 82B.

Figure 14:
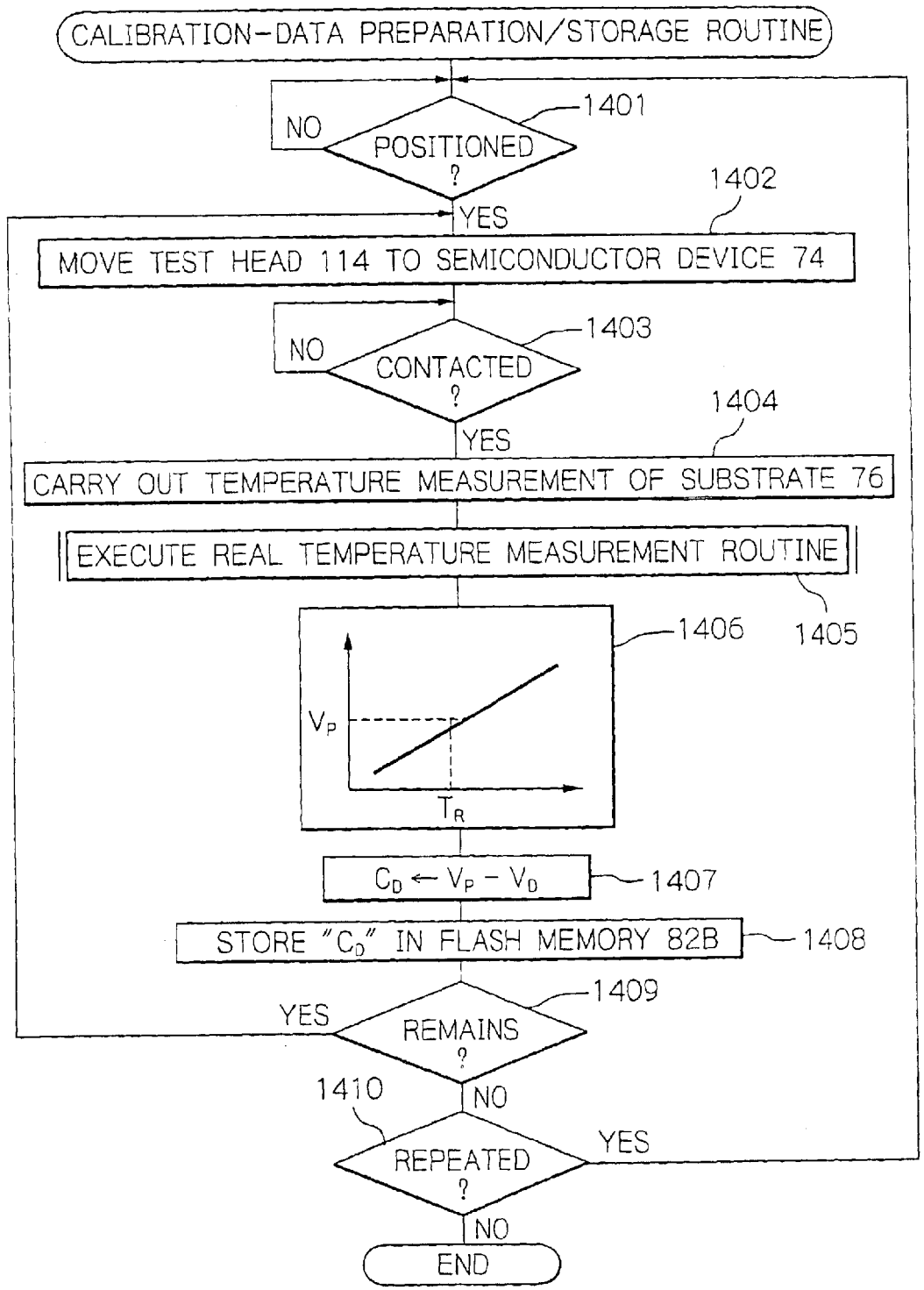
FIG. 14 is a flowchart of a calibration-data preparation/storage routine executed in a system control unit of the test system shown in FIG. 13.

FIG. 14 shows a flowchart of a calibration-data preparation/storage routine which is executed in the system control unit 100. Note, the execution of the calibration-data preparation/storage routine is started by either operating a previously allocated function key on the keyboard 106 or double-clicking the mouse 110 on a routine staring item displayed on the display unit 108.

At step 1401, it is monitored whether a silicon wafer SW has been positioned at the predetermined position on the test stage 112 by the aforesaid automatic wafer transferring/positioning system. After the positioning of the silicon wafer SW at the predetermined position is confirmed, the control proceeds to step 1402, in which the test head 114 is moved to a position just above any one of the semiconductor devices 74 on the silicon wafer SW, and is then moved down toward the semiconductor device 74 concerned.

At step 1403, it is monitored whether the probe contacts PC of the test head 114 are in contact with the electrode pads of the semiconductor device 74, and the movement of the test head 114 is stopped when the contact between the probe contacts PC and the electrode pads is confirmed.

At step 1404, a temperature measurement of the silicon substrate 76 is carried out by operating the internal temperature management system, including the temperature measuring sensor 80 and the temperature calibration circuit 82, with the TMS drive circuit 122. In particular, a forward current is supplied from the constant current source 80B to the p-n junction diode 80A, thereby producing a forward voltage in the diode 80A, and the forward voltage is detected as digital forward voltage data $V_D$ through the A/D converter 82A. Then, although the detected digital voltage data $V_D$ is input to the adder 82C, it is output from the adder 82C as it stands, because the flash memory 82B stores no calibration data at this stage, i.e. because zero data are stored in the flash memory 82B. The detected digital voltage data $V_D$ is stored in the RAM of the system control unit 100.

At step 1405, a real temperature measurement routine is executed as a subroutine to thereby measure a real temperature $T_R$ of the silicon substrate 76 of the semiconductor device 74, using the additional temperature measuring sensor 84. Note, the real temperature measurement routine is explained in detail hereinafter, with reference to FIG. 16.

At step 1406, proper digital voltage data $V_P$ is calculated from a one-dimensional calibration map on the basis of the measured real temperature $T_R$.

Figure 15:
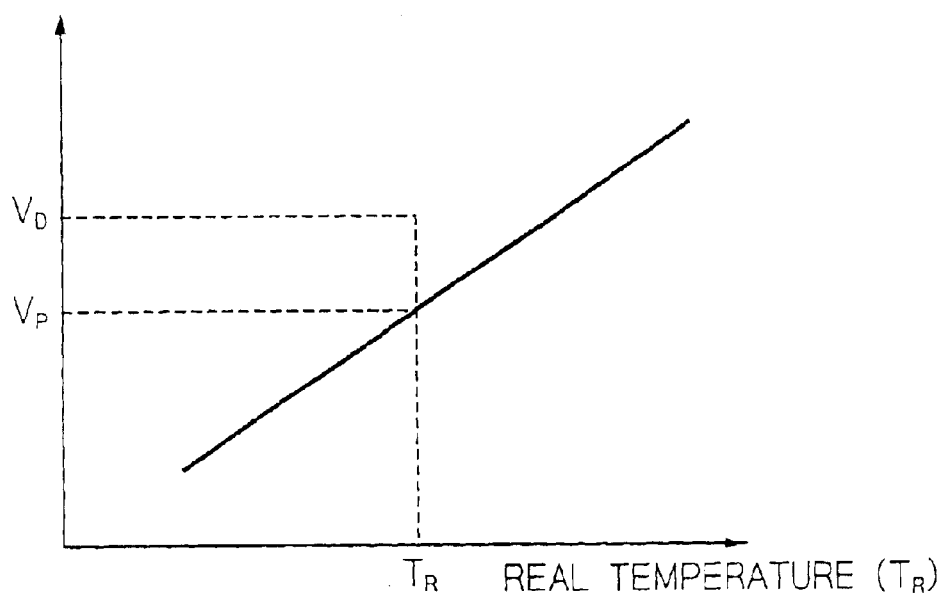
FIG. 15 is a graph showing a one-dimensional calibration map which represents a temperature-voltage characteristic of a diode used in the conventional type temperature measuring sensor.

As shown in FIG. 15, the one-dimensional calibration map represents a temperature-voltage characteristic of the diode 80A, i.e. a corresponding relationship between a real temperature ($T_R$) and a proper voltage ($V_P$) to be produced in the diode 80A at the real temperature ($T_R$). As stated above, since the temperature measuring sensor 80 is of the conventional type, the detected digital voltage data $V_D$ is offset from the corresponding proper voltage data $V_P$ for the reasons already discussed above, as shown in FIG. 15.

At step 1407, an offset amount between the detected digital voltage data $V_D$ and the corresponding proper voltage data $V_P$ is calculated as calibration data $C_D$ as follows:

$$C_D \leftarrow V_P - V_D$$

Then, at step 1408, the calibration data $C_D$ is stored in the flash memory 82B by the system control unit 100 through the test head 114.

At step 1409, it is determined whether a semiconductor device 74 to be processed remains on the silicon wafer SW.

If semiconductor device 74 to be processed remains, the control returns to step 1402. Namely, the routine comprising 1402 to 1409 is repeated until all the semiconductor devices 74 on the silicon wafer SW are processed.

When it is confirmed that all the semiconductor devices 74 on the silicon wafer SW are processed, the control proceeds from step 1409 to step 1410, in which it is determined whether this main routine should be repeated, i.e. whether a silicon wafer SW remains to be processed. When the existence of a remaining silicon wafer SW is confirmed, the control returns to step 1401. When there is no silicon wafer to be processed, this main routine ends.

Figure 16:
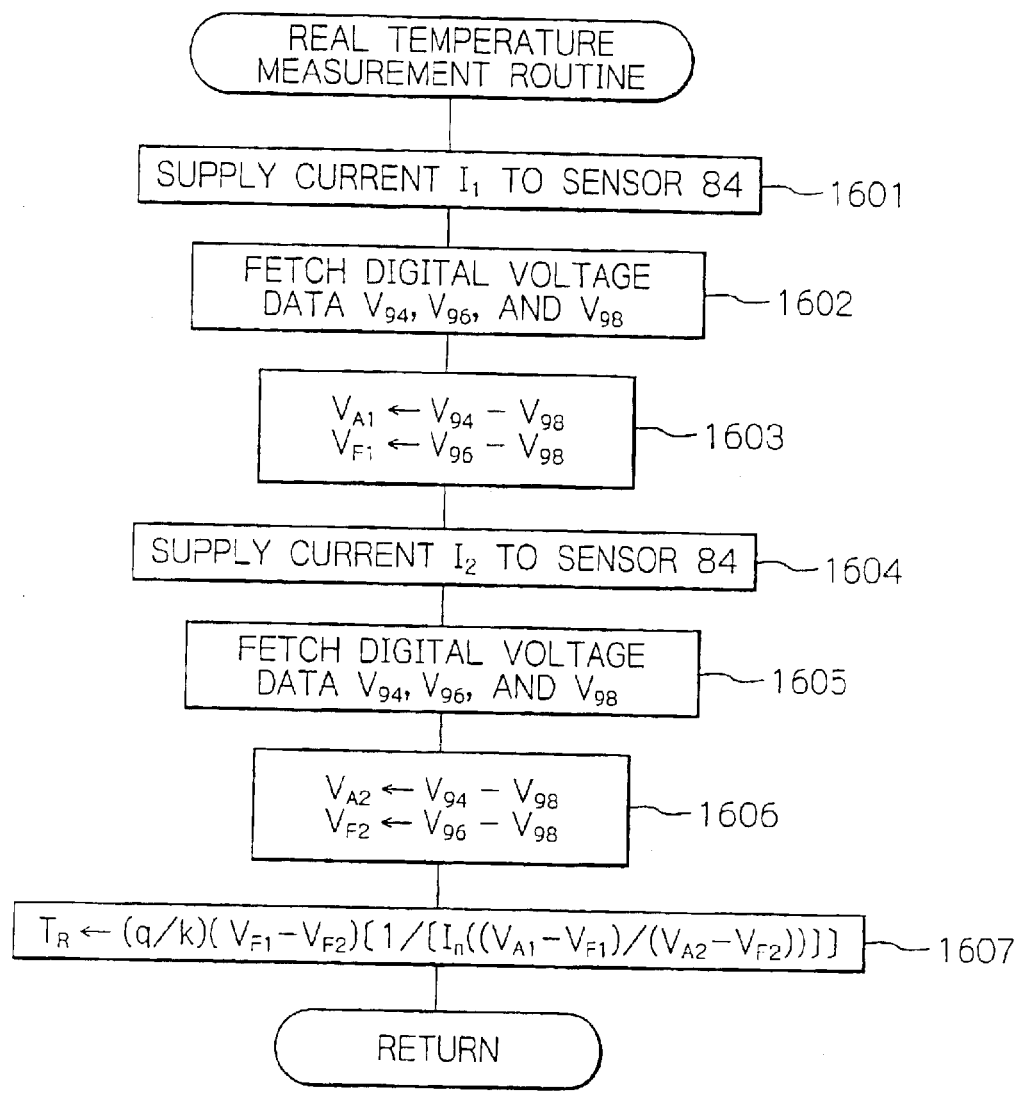
FIG. 16 is a flowchart of a real temperature measurement routine which is executed as a subroutine in the calibration-data preparation/storage routine of FIG. 14

FIG. 16 shows a flowchart of the real temperature measurement routine executed at step 1405 of the calibration-data preparation/storage routine shown in FIG. 14.

At step 1601, a constant current $I_1$ is supplied from the sensor drive circuit 124 to the additional temperature measuring sensor 84 including the p-n junction diode 86 and the resistor 88 through the first electrode pad 90, with the second electrode pad 92 being grounded. Then, at step 1602, voltages $V_{94}$, $V_{96}$, and $V_{98}$ of the third, fourth and fifth electrode pads 94, 96 and 98 are successively fetched as digital voltage data through the signal processing circuit 126.

At step 1603, the following calculations are carried out on the basis of the fetched voltage data $V_{94}$, $V_{96}$, and $V_{98}$:

$$V_{A1} \leftarrow V_{94} - V_{98}$$

$$V_{F1} \leftarrow V_{96} - V_{98}$$

Namely, while the temperature measuring sensor 84 is supplied with the constant current $I_1$, the potential difference $V_{A1}$ is calculated between the third and fifth electrode pads 94 and 98, and the potential difference $V_{F1}$ is calculated between the fourth and fifth electrode pads 96 and 98.

At step 1604, a constant current $I_2$ is supplied from the sensor drive circuit 124 to the temperature measuring sensor 84 including the p-n junction diode 86 and the resistor 88. Then, at step 1605, voltages $V_{94}$, $V_{96}$, and $V_{98}$ of the third, fourth and fifth electrode pads 94, 96 and 98 are successively fetched as digital voltage data through the signal processing circuit 126.

At step 1606, the following calculations are carried out on the basis of the fetched voltage data $V_{94}$, $V_{96}$, and $V_{98}$:

$$V_{A2} \leftarrow V_{94} - V_{98}$$

$$V_{F2} \leftarrow V_{96} - V_{98}$$

Namely, while the temperature measuring sensor 84 is supplied with the constant current $I_2$, the potential difference $V_{A2}$ is calculated between the third and fifth electrode pads 94 and 98, and the potential difference $V_{F2}$ is calculated between the fourth and fifth electrode pads 96 and 98.

At step 1607, the following calculation is carried out on the basis of the calculated potential differences $V_{A1}$, $V_{F1}$, $V_{A2}$ and $V_{F2}$:

$$T_R = (q/k)(V_{F1} - V_{F2})[1/[\ln((V_{A1} - V_{F1})/(V_{A2} - V_{F2}))]]$$

Herein: k is Boltzmann's constant;

$T_R$ is an absolute temperature of the diode 86; and q is an electron charge.

Note, of course, a temperature of the semiconductor device 74 is represented by the temperature $T_R$ of the silicon substrate 76.

In the second embodiment of the present invention, for example, the internal temperature management system including the temperature measuring sensor 80 and the temperature calibration circuit 82 is used to control a clock pulse generator included in the semiconductor device 74, to thereby manage a temperature of the semiconductor device 74. Namely, when the temperature of the semiconductor device 74 exceeds a predetermined upper temperature limit, the internal temperature management system controls the clock pulse generator such that a frequency of a basic clock pulse signal generated therein is lowered, to thereby suppress a rise in the temperature of the semiconductor device 74.

Figure 17:
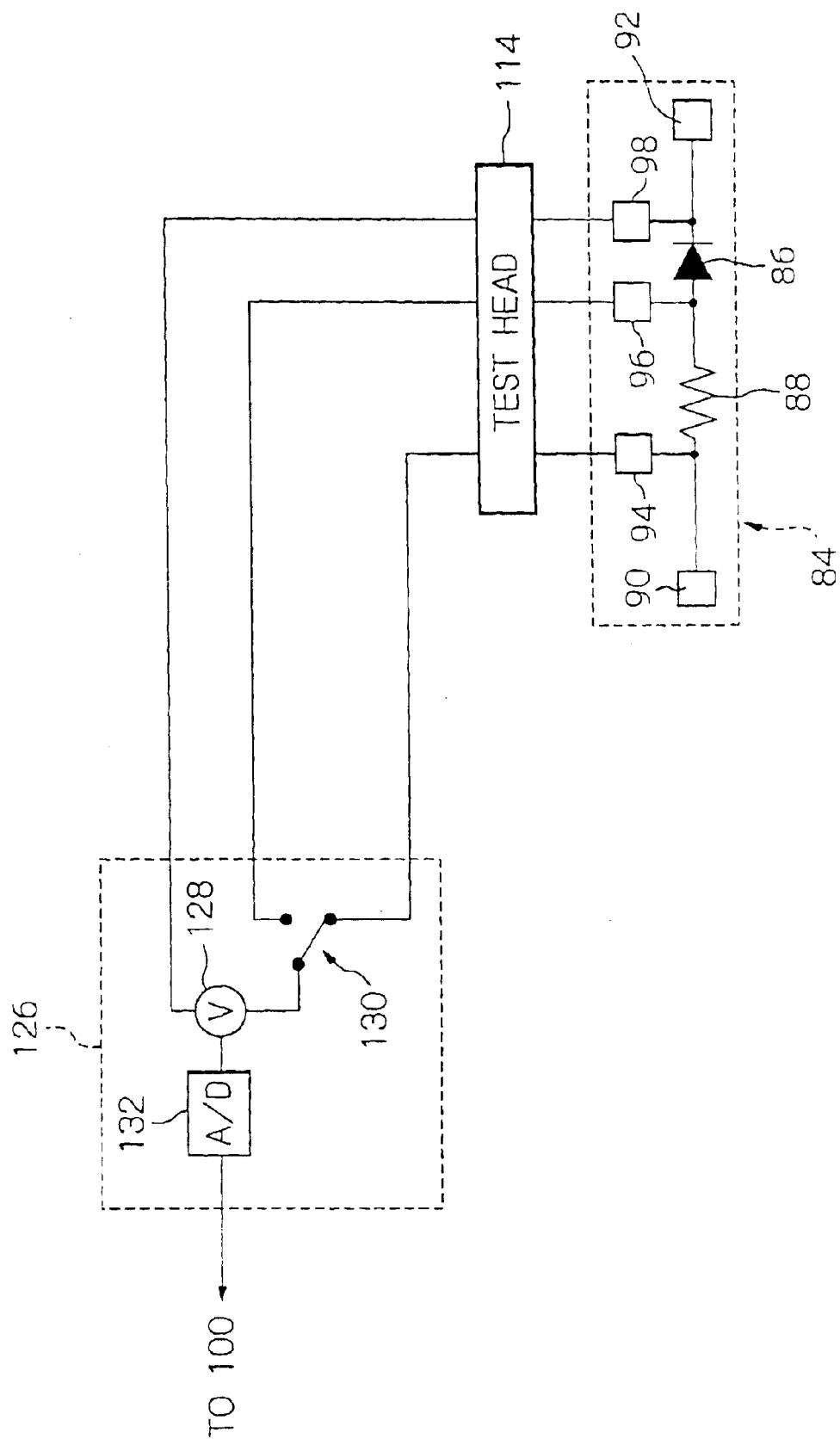
FIG. 17 is a block diagram showing a modification of the test system shown in FIG. 13.

In the calibration-data preparation/storage system shown in FIG. 13, although the potential differences ($V_{A1}$, $V_{F1}$; $V_{A2}$, $V_{F2}$) are calculated on the basis of the voltages $V_{94}$, $V_{96}$, and $V_{98}$ of the third, fourth and fifth electrode pads 94, 96 and 98, it is possible to directly detect the potential differences ($V_{A1}$, $V_{F1}$; $V_{A2}$, $V_{F2}$), as shown in FIG. 17. Namely, in this case, the signal processing circuit 126 includes a voltage meter 128, a switching circuit 130 associated with the voltage meter 128, and an analog-to-digital (A/D) converter 132 to connected to an output terminal of the voltage meter 128.

As shown in FIG. 17, the voltage meter 128 has two detection terminals, one of which is selectively connected to either the third electrode pad 94 or the fourth electrode pad 96 through the intermediary of the switching circuit 130 and the test head 114, with this detection terminal being defined as a first detection terminal, and the remaining detection terminal or second detection terminal is connected to the fifth electrode pad 98 through the intermediary of the test head 114.

Thus, when the switching circuit 130 is operated such that the first detection terminal of the voltage meter 128 is connected to the third electrode pad 94, the voltage meter 128 detects a potential difference ($V_{A1}$ or $V_{A2}$) produced between the terminal ends of both the semiconductor diode 86 and the resistor 88. On the other hand, when the switching circuit 130 is operated such that the first detection terminal of the voltage meter 128 is connected to the fourth electrode pad 96, the voltage meter 128 detects a potential difference ($V_{F1}$ or $V_{F2}$) between the terminal ends of the semiconductor diode 86. Each of the detected voltage differences ($V_{A1}$ or $V_{A2}$; and $V_{F1}$ or $V_{F2}$) is fetched as digital potential difference data by the system control unit 100 through the A/D converter 132.

FIG. 18 shows a flowchart of the real temperature measurement routine executed at step 1405 of the calibration-data preparation/storage routine shown in FIG. 14, when the potential differences ($V_{A1}$ or $V_{A2}$; and $V_{F1}$ or $V_{F2}$) are directly detected by the voltage meter 128, as shown in FIG. 17.

At step 1801, a constant current $I_1$ is supplied from the sensor drive circuit 124 to the additional temperature measuring sensor 84 including the p-n junction diode 86 and the resistor 88 through the first electrode pad 90, with the second electrode pad 92 being grounded.

At step 1802, a potential difference $V_{A1}$, produced between the terminal ends of both the semiconductor diode 86 and the resistor 88, is fetched as digital potential difference data from the A/D converter 132. Namely, the switching circuit 130 is operated such that the first detection terminal of the voltage meter 128 is connected to the third electrode pad 94, and thus the potential difference $V_{A1}$ is detected by the voltage meter 128.

After the detection of the potential difference $V_{A1}$ is completed, the control proceeds to step 1803, in which a potential difference $V_{F1}$, produced between the terminal ends of the semiconductor diode 86, is fetched as digital potential difference data from the A/D converter 132. Namely, the switching circuit 130 is operated such that the first detection terminal of the voltage meter 128 is connected to the fourth electrode pad 96, and thus the potential difference $V_{F1}$ is detected by the voltage meter 128.

After the detection of the potential difference $V_{F1}$ is completed, the control proceeds to step 1804, in which a constant current $I_2$ is supplied from the sensor drive circuit 124 to the temperature measuring sensor 84 including the p-n junction diode 86 and the resistor 88.

At step 1805, a potential difference $V_{A2}$, produced between the terminal ends of both the semiconductor diode 86 and the resistor 88, is fetched as digital potential difference data from the A/D converter 132. Namely, the switching circuit 130 is operated such that the first detection terminal of the voltage meter 128 is connected to the third electrode pad 94, and thus the potential difference $V_{A2}$ is detected by the voltage meter 128.

After the detection of the potential difference $V_{A2}$ is completed, the control proceeds to step 1806, in which a potential difference $V_{F2}$, produced between the terminal ends of the semiconductor diode 86, is fetched as digital potential difference data from the A/D converter 132. Namely, the switching circuit 130 is operated such that the first detection terminal of the voltage meter 128 is connected to the fourth electrode pad 96, and thus the potential difference $V_{F2}$ is detected by the voltage meter 128.

After the detection of the potential difference $V_{F2}$ is completed, the control proceeds to step 1807, in which the following calculation is carried out on the basis of the detected potential differences $V_{A1}$, $V_{F1}$, $V_{A2}$ and $V_{F2}$:

$$T_R = (q/k)(V_{F1} - V_{F2})[1/[\ln((V_{A1} - V_{F1})/(V_{A2} - V_{F2}))]]$$

Herein: k is Boltzmann's constant;

$T_R$ is an absolute temperature of the diode 86; and q is an electron charge.

Finally, it will be understood by those skilled in the art that the foregoing description is of preferred embodiments of the device and system, and that various changes and modifications may be made to the present invention without departing from the spirit and scope thereof.

What is claimed is:

1. A temperature measuring sensor that is incorporated in a substrate of a semiconductor device to measure a real temperature of said substrate, which sensor comprises:

a semiconductor diode formed in said substrate; and a resistor formed in said substrate and connected to said semiconductor diode in series, wherein a first forward constant current is supplied to said semiconductor diode through said resistor such that a potential difference $V_{A1}$ is produced between terminal ends of both said semiconductor diode and said resistor connected in series, and such that a potential difference $V_{F1}$ is produced between terminal ends of said semiconductor diode;

a second forward constant current is supplied to said semiconductor diode through said resistor such that a potential difference $V_{A2}$ is produced between terminal ends of both said semiconductor diode and said resistor connected in series, and such that a potential difference $V_{F2}$ is produced between terminal ends of said semiconductor diode; and the measurement of said real temperature is carried out based on said four potential differences $V_{A1}$, $V_{F1}$, $V_{A2}$ and $V_{F2}$.

2. A temperature measuring sensor as set forth in claim 1, wherein the real temperature T of the substrate of said semiconductor device is calculated by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

3. A temperature measuring sensor as set forth in claim 1, wherein further comprising three electrode pads formed on said substrate to thereby detect said potential differences ($V_{A1}$ and $V_{F1}$; $V_{A2}$ and $V_{F2}$), said semiconductor diode having a first terminal and a second terminal, said resistor having a first end connected to the first terminal of said semiconductor diode, one of said three electrode pads being connected to a conductive lead extending from the first terminal of said semiconductor diode at a location in the vicinity of the first terminal of said semiconductor diode, another electrode pad being connected to a conductive lead extending from the second terminal of said semiconductor diode at a location in the vicinity of the second terminal of said semiconductor diode, the remaining electrode pad being connected to a conductive lead extending from a second end of said resistor, which is remote from the first terminal of said semiconductor diode, at a location in the vicinity of the second end of said resistor.

4. A semiconductor device comprising:

a semiconductor substrate on which a main circuit section is defined; and a temperature measuring sensor incorporated in said semiconductor substrate so as to measure a real temperature of said semiconductor substrate, said temperature measuring sensor including:
  a semiconductor diode formed in said semiconductor substrate; and
  a resistor formed in said semiconductor substrate and connected to said semiconductor diode in series, wherein a first forward constant current is supplied to said semiconductor diode through said resistor such that a potential difference $V_{A1}$ is produced between terminal ends of both said semiconductor diode and said resistor connected in series, and such that a potential difference $V_{F1}$ is produced between terminal ends of said semiconductor diode;

a second forward constant current is supplied to said semiconductor diode through said resistor such that a potential difference $V_{A2}$ is produced between terminal ends of both said semiconductor diode and said resistor connected in series, and such that a potential difference $V_{F2}$ is produced between terminal ends of said semiconductor diode; and the measurement of said real temperature is carried out based on said four potential differences $V_{A1}$, $V_{F1}$, $V_{A2}$ and $V_{F2}$.

5. A semiconductor device as set forth in claim 4, wherein the real temperature T of the substrate of said semiconductor device is calculated by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

6. A semiconductor device as set forth in claim 4, further comprising three electrode pads formed on said substrate to thereby detect said potential differences ($V_{A1}$ and $V_{F1}$; $V_{A2}$ and $V_{F2}$), said semiconductor diode having a first terminal and a second terminal, said resistor having a first end connected to the first terminal of said semiconductor diode, one of said three electrode pads being connected to a conductive lead extending from the first terminal of said semiconductor diode at a location in the vicinity of the first terminal of said semiconductor diode, another electrode pad being connected to a conductive lead extending from the second terminal of said semiconductor diode at a location in the vicinity of the second terminal of said semiconductor diode, the remaining electrode pad being connected to a conductive lead extending from a second end of said resistor, which is remote from the first terminal of said semiconductor diode, at a location in the vicinity of the second end of said resistor.

7. A temperature measuring method of measuring a temperature of a semiconductor substrate, using a temperature measuring sensor incorporated therein, said temperature measuring sensor having a semiconductor diode formed in said semiconductor substrate, and a resistor formed in said semiconductor substrate and connected to said semiconductor diode in series, which method comprises:

supplying a first forward constant current to said semiconductor diode through said resistor such that a potential difference $V_{A1}$ is produced between terminal ends of both said semiconductor diode and said resistor connected in series, and such that a potential difference $V_{F1}$ is produced between terminal ends of said semiconductor diode;

supplying a second forward constant current to said semiconductor diode through said resistor such that a potential difference $V_{A2}$ is produced between terminal ends of both said semiconductor diode and said resistor connected in series, and such that a potential difference $V_{F2}$ is produced between terminal ends of said semiconductor diode; and calculating a real temperature T of the semiconductor substrate based on said potential differences $V_{A1}$, $V_{F1}$, $V_{A2}$, and $V_{F2}$.

8. A temperature measuring method as set forth in claim 7, wherein the calculation of the real temperature of said semiconductor substrate is carried out by the following formula:

$$T=(q/k)(V_{F1}-V_{F2})[1/[\ln((V_{A1}-V_{F1})/(V_{A2}-V_{F2}))]]$$

herein: T is an absolute temperature, k is Boltzmann's constant, and q is an electron charge.

9. A temperature measuring method as set forth in claim 7, wherein said temperature measuring sensor further comprises three electrode pads formed on said substrate to thereby detect said potential differences ($V_{A1}$ and $V_{F1}$; $V_{A2}$ and $V_{F2}$), said semiconductor diode having a first terminal and a second terminal, said resistor having a first end connected to the first terminal of said semiconductor diode, one of said three electrode pads being connected to a conductive lead extending from the first terminal of said semiconductor diode at a location in the vicinity of the first terminal of said semiconductor diode, another electrode pad being connected to a conductive lead extending from the second terminal of said semiconductor diode at a location in the vicinity of the second terminal of said semiconductor diode, the remaining electrode pad being connected to a conductive lead extending from a second end of said resistor, which is remote from the first terminal of said semiconductor diode, at a location in the vicinity of the second end of said resistor.

* * * * *